Sept. 22, 1953

O. C. LEVY

COMPUTER 2,652,977

Filed Dec. 21, 1949

10 Sheets-Sheet 1

INVENTOR.
Oscar C. Levy,
BY George H. Simmons
Atty.

Sept. 22, 1953

O. C. LEVY

COMPUTER 2,652,977

Filed Dec. 21, 1949

10 Sheets-Sheet 2

INVENTOR.
Oscar C. Levy,
BY George H. Simmons
Atty.

COMPUTER

Filed Dec. 21, 1949 10 Sheets-Sheet 3

INVENTOR.
Oscar C. Levy,
BY George H. Simmons
Atty.

COMPUTER

INVENTOR.
Oscar C Levy,
BY George H Simmons
Atty.

INVENTOR.
Oscar C. Levy,
BY George H. Simmons
Atty.

Sept. 22, 1953 O. C. LEVY 2,652,977

COMPUTER

Filed Dec. 21, 1949 10 Sheets-Sheet 6

INVENTOR.
Oscar C Levy,
BY George H Simmons
atty

INVENTOR.
Oscar C. Levy,
BY George H Simmons
atty

Sept. 22, 1953 O. C. LEVY 2,652,977

COMPUTER

Filed Dec. 21, 1949 10 Sheets-Sheet 8

INVENTOR.
Oscar C Levy,
BY George H Simmons
atty.

Sept. 22, 1953 O. C. LEVY 2,652,977

COMPUTER

Filed Dec. 21, 1949 10 Sheets-Sheet 9

INVENTOR.
Oscar C. Levy,
BY George H. Simmons
Atty.

INVENTOR.
Oscar C Levy,
BY George H Simmons
Atty.

Patented Sept. 22, 1953

2,652,977

UNITED STATES PATENT OFFICE 2,652,977

COMPUTER

Oscar C. Levy, Chicago, Ill., assignor to American Totalisator Company, Inc., Baltimore, Md., a corporation of Maryland Application December 21, 1949, Serial No. 134,313

26 Claims. (Cl. 235—61)

This invention relates to automatic computers and has for its principal object the provision of a new and improved device of this kind.

It is a main object of the invention to provide a computer for automatically determining in sequence the ratio existing between each one of a plurality of individual amounts and the sum of said amounts, and for controlling an indicator individual to each amount to indicate the ratio so computed.

Another object of the invention is to provide a computer for automatically determining in sequence the ratio between each one of a plurality of individual amounts and the sum of said amounts minus a fixed percentage of said sum, and for controlling an indicator individual to each amount to indicate the ratio so computed.

Another object of the invention is to provide in a computer for automatically determining in sequence the ratio between each one of a plurality of individual amounts and the sum of said amounts, a device for subtracting one of said individual amounts from said sum and for computing said ratios against the resulting difference minus a fixed percentage of said difference, and for controlling an indicator individual to each amount to indicate the ratio so computed.

Another object of the invention is to provide in a computer, for use in a system in which sums are designated by simultaneously closing a plurality of circuits per digit, a register switch having a plurality of wipers corresponding in number to said circuits, which wipers are stepped over contacts until circuits are completed over all of the wipers simultaneously thereby to stop the switch in a position corresponding to a digit registered in the switch contacts.

Another object of the invention is to provide in a computer a register switch having wipers which are stepped over contacts in search of marked contacts designating a digit registered in said contacts, over which wipers circuits are completed to stop the switch on the marked contacts preparatory to stepping the switch a number of steps corresponding to a subtrahend digit and over which wipers circuits are subsequently extended to transmit out of the switch the digit representing the difference between said first digit and said subtrahend.

Still another object of the invention is to provide a computer for determining and controlling the display of a series of ratios accurately and rapidly.

A further object of the invention is to provide a computer that can be manufactured at low cost and can be maintained in proper working condition economically.

Further objects of the invention, not specifically mentioned here, will be apparent from the detailed descriptions and claims which follow, reference being had to the accompanying drawings in which a preferred embodiment of the invention is shown by way of example only and in which:

As brought out in the co-pending application of Johnston, Serial No. 16,310, filed March 22, 1948, now Patent 2,563,041, issued August 7, 1951, a totalisator accumulates the total value of tickets sold in a particular pool and also the total value of the tickets sold on each runner in that pool. At periodic intervals, usually once every ninety seconds, the adding machines are momentarily connected to indicators and the values thus accumulated in the adding machines are registered on the indicators, which are visible at various points about the premises. Each digit of the values thus displayed is displayed under the control of five relays, two of which must be operated to indicate the digit. After these relays are operated, they are maintained in operated position and maintain positive potential on the busses over which they are operated, after the indication control relays have restored to disconnect the indicators from the adding machines.

The indication busses are also extended to a computing room in the pari-mutuel department, so as to display the values therein on a suitable indicator, usually a miniature indicator. In the computing room, an odds control man, usually called the odds man, is provided with a set of keys through the manipulation of which he selectively controls the miniature indicator to display first the total sum and then the sums on the individual runners, one at a time.

Teamed with the odds man is an odds calculator who is provided with tables from which he can determine the approximate odds on a particular runner from the sum in the total pool and the sum registered on that runner. The calculator gives the approximate odds to the odds man who then manipulates his keys to select the odds indicator corresponding to that runner and to set that indicator to indicate the approximate odds on that runner.

In States where racing is permitted, the racing statutes provide for withdrawing from the total sums wagered a certain percentage known as the "take." The percentage so withdrawn varies from six to fifteen percent, depending upon the State, and the tables used by the calculator are based upon that part of the total pool available for distribution, that is, the net pool remaining after the "take" has been deducted.

Figure 1:
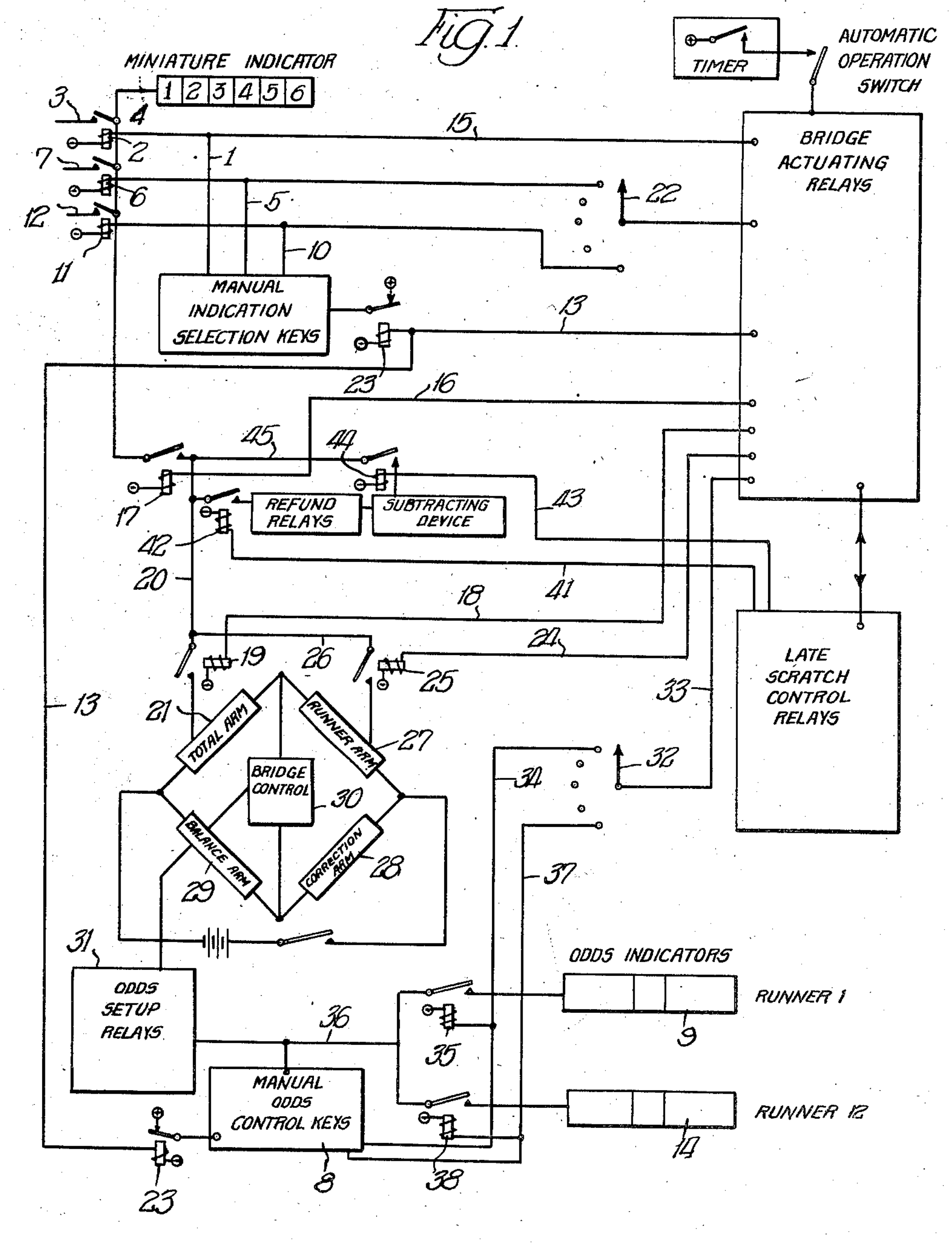
Fig. 1 is a single line diagram of the invention.

As will be seen in Fig. 1, where the odds computer is shown schematically by a single line diagram, when the odds man operates the proper manual indication selection key, a circuit will be closed from positive over conductor 1 through the winding of relay 2 to negative, operating relay 2 which connects the total bus 3 to the bus 4 thereby to operate the miniature indicator to indicate the total sum then in the total pool. Each digit of such sum being controlled by five relays, busses 3 and 4 contain five wires per digit, and, as shown, the indicator is arranged to handle six digits so that these busses contain thirty wires each.

With the total then in the pool indicated, the calculator selects the proper table and the odds man reoperates the manual selection keys to open the circuit to relay 2 and to extend a circuit from positive over conductor 5 through relay 6 to negative, operating relay 6 which connects the first runner bus 7 to the bus 4 and miniature indicator. The indicator is thus set to indicate the sum registered on runner number one, and by reference to his tables the calculator determines the approximate odds existing on that runner. The calculator informs the odds man of these approximate odds and the odds man manipulates the odds control keys 8 first to close a circuit from positive through relay 35 to negative, thereby to connect the odds indicator 9 corresponding to runner number one to the odds setup control bus 36; and further manipulates the control keys to set the indicator to the approximate odds thus determined. Since the odds indicators, like the other indicators, are controlled by five relays per digit, bus 36 contains eleven wires, five for each of two digits that the indicator is capable of displaying, and one for a dash inserted between these digits to indicate fractional odds, as will presently appear.

The odds on runner number one thus being determined and indicated, the odds man manipulates the selection keys to open the circuit of relay 6 and to close the circuit to the relay, not shown, corresponding to runner number two, the foregoing process being thus repeated for each runner until a circuit is closed over conductor 10 to energize relay 11 and thereby connect the bus 12 corresponding to the twelfth or last runner to the miniature indicator, and the control keys 8 manipulated to energize relay 38, thereby to connect the odds indicator 14 corresponding to the last runner to the odds control bus 36.

The foregoing operations being completed, the odds indications remain until the next indication cycle of the totalisator. In practice, as soon as the line of odds has been completed, the odds man will re-operate the selection keys to close the circuit to relay 2, thereby connecting the total bus to the miniature indicator, so that he and the calculator will be informed of the new total in the pool as soon as it is taken from the adding machine.

The foregoing manual operations are time-consuming. A fast odds man, teamed with a fast calculator, ordinarily can determine a line of odds on twelve runners in approximately one minute; and since in most instances the indication cycle of the totalisator is ninety seconds, the complete line of odds is displayed but briefly before a new indication cycle begins.

The present invention provides for computing odds automatically instead of manually, and for automatically displaying the odds so determined. With a full line of twelve runners, the computer of the present invention will determine and display the approximate odds in approximately five seconds, so that those odds will be displayed during a major portion of an indication cycle rather than during a minor portion, as is the case with manual operation.

In the device of the present invention, one arm of a Wheatstone bridge is automatically set to an ohmic resistance corresponding to the total sum in the pool; a second arm of the bridge is set to an ohmic value corresponding to the sum registered on a particular runner; a third arm of the bridge is set to an ohmic value corresponding to the percentage of the total sum available for distribution after the take has been deducted; and the fourth or balancing arm automatically adjusted step-by-step to bring the bridge into balance. The odds determined by the point at which the bridge is brought into balance are set automatically on the indicators, whereupon the sum on the first runner registered in the second arm of the bridge is removed and the sum corresponding to the second runner substituted therefor and the bridge re-balanced to determine the odds on the second runner, this process being repeated until the odds on all of the runners have been determined and indicated. As soon as the line of odds has been completed, the total arm, the individual arm, and the balancing arm of the bridge and the controls are returned to normal in readiness for re-operation at the beginning of the next indication cycle.

In American practice, winners are entitled to a return of the money paid for the winning tickets plus the odds on those tickets. Thus, for example, the odds on a winning ticket are two to one, each two-dollar ticket paying six dollars, that is, the two-dollar purchase price plus two to one odds or four dollars. The automatic computer takes this into account, indicating the odds only. Thus when odds of two to one are to be indicated, the bridge balances when the amount in the total pool remaining after the "take" has been deducted is three times the amount registered on the runner. In all instances, the odds indicated are the true ratio of the sums, at the balance point of the bridge, minus one.

At the start of the sale of tickets on a particular race, odds are ordinarily not indicated until the sales total a sum large enough to render display of the approximate odds advisable. In the case of the automatic computer of the present invention, when the total sum reaches this starting value, an automatic operation switch is manually closed to connect the bridge actuating relays to the timer by which the indication cycle of the totalisator is controlled. At the next indication cycle, the timer momentarily closes a circuit to positive, whereupon the bridge actuating relays function to move an access switch comprising wipers 22 and 32 from normal into engagement with the first contact in the banks engaged by those wipers. A circuit is also closed over conductor 13 through the winding of relays 23 to negative, operating relays 23 which remove positive from the manual indication selection keys and also from the manual odds control keys, thereby to render those keys ineffective.

As shown in Fig. 1, there are two relays 23, one associated with the selection keys and the other associated with the control keys, and these relays are operated simultaneously and are in effect one relay. In practice, one or more relays may be used as desired.

As soon as the timer removes positive from the bridge actuating relays, a circuit is closed by these relays from positive over conductor 15 through the winding of relay 2, thereby connecting the total bus 3 to the bus 4. A circuit is also completed from positive over conductor 16 through the winding of relay 17, operating that relay which extends the bus 4 to the computer bus 20; and a circuit is completed from positive over conductor 18 through the relay 19 to operate that relay and extend the computer bus 20 to the total arm 21 of the bridge, that arm thus being set to a value corresponding in ohms to the sum in the total.

The circuits of relays 2 and 19 are then opened and other circuits closed from positive through wiper 22 and the relay 6 to negative, thereby to operate that relay to connect the bus 7 to the busses 4 and 20, and a circuit is completed from positive over conductor 24 through relay 25 to negative, to operate that relay to extend the extension 26 of the bus 20 into the runner arm 27 of the bridge. The runner arm is thus set to an ohmic value corresponding to the sum then registered on the runner number one.

The third or correcting arm 28 of the bridge, located opposite the total arm, is manually set to an ohmic value corresponding to the percentage of the total sum remaining after the take has been deducted. This arm is set to a desired ohmic value prior to the initiation of a computing cycle and being once set remains fixed so long as the computer is used at locations where the take is the same.

The fourth or balancing arm 29 of the bridge contains a total ohmic value proportional to the ohmic value of the correcting arm 28, the resistance of the balancing arm being varied step-by-step until the bridge is brought into balance, at which time the bridge control 30 functions through the balance arm to control the odds setup relays 31.

Simultaneously with the closing of a circuit over wiper 22, a circuit is closed over wiper 32 and conductor 34 through the windng of relay 35 to negative, operating that relay to connect the odds indicator 9, corresponding to runner number one, to the odds control bus 36, so that when the bridge is balanced and the odds setup 31 operated, indicator 9 will be set to indicate the approximate odds thus determined.

The odds on runner number one having thus been determined, the access switch is operated to step wipers 22 and 32 from their first to their second bank contacts, the circuit of relay 6 is opened to disconnect bus 7 from the computer bus 20, thereby to wipe out the setting of the runner arm 27. A circuit closed through wiper 22 and its second bank contact to a relay, not shown, operates that relay to connect the bus corresponding to the second runner to the bus 4, thereby to set the runner arm 27 to an ohmic value corresponding to the sum on runner number two. A corresponding circuit is extended through wiper 32 to connect the odds indicator corresponding to runner number two to the bus 36, and the bridge is re-balanced to determine the odds on that runner.

The foregoing operations are repeated step-by-step until odds have been determined on all of the runners in the race, at which time the access switch returns to normal and relays 23 are de-energized to return the control of the indicators to the manual keys. The odds man and calculator may then check the odds computed by the automatic apparatus, and should occasion arise alter the odds as required. Restoration of the access switch to normal also disconnects the computer bus from the bus 4 and restores all of the bridge arms, except the correcting arm, to normal. When the next indication cycle is initiated, the foregoing operations are repeated.

It sometimes happens that after a number of tickets have been sold upon a particular runner, that runner will be scratched and, according to the rules of the track, purchasers of tickets on a late scratch are entitled to a refund. Obviously odds computed upon a total which includes a sum to be refunded will not be accurate, and in case of a late scratch the operation of the automatic computer is modified as follows:

Late scratch control relays are brought into play to exercise control over the bridge actuating relays, so that when a new indication cycle is initiated relay 2 is not immediately operated to connect the total bus 3 to the bus 4, but rather the relay, such as 6 or 11, corresponding to the scratched runner, is operated to connect the bus corresponding to that runner to the bus 4. Relay 17 is operated as before, and a circuit is closed from positive over conductor 41 through relay 42 to negative to operate that relay and extend the bus 20 into refund relays where the sum registered on the scratched runner is stored. The relay corresponding to this runner and relay 42 are then restored, relay 2 is operated, and a circuit extended from positive over conductor 43 through relay 44 to negative, operating relay 44 to extend the extension 45 of the bus 20 into a subtracting device, wherein the total then existing in the pool is registered. The subtracting device is then operated under the control of the refund relays and the sum stored in those relays subtracted from the total then in the pool. The corrected total thus being determined, the circuit of relay 17 is opened, the circuit of relay 19 closed, relay 44 is maintained operated, and the corrected total placed in the total arm 21 of the bridge. Relays 2, 19, and 44 are then de-energized, and relays 6, 17 and 25 are energized, and the sum then on runner number one is registered in the runner arm and the odds computed against the corrected total as before.

After all of the odds on the runners then remaining in the race have been computed and indicated, the access switch returns to normal and upon the next indication cycle relay 2 is immediately operated, together with relays 17 and 44, to register the total sum in the subtracting device and the refund sum stored in the refund relays is subtracted from this total and from each succeeding total until the sale of tickets on that race is closed.

Approximate odds indications, in accordance with standard American practice, are numerous, varying from 99 to 1, down to fractional odds, and in most instances more than fifty different odds can be computed and indicated. I have found that it is convenient to set the total and individual runner arms of the bridge to ohmic values corresponding to one ohm per dollar of value in the sums. Other resistance values will work equally well. I have also found it convenient to place a maximum of 1,000 ohms in the correcting arm of the bridge when zero "take" is encountered. This arm of the bridge is set to a lesser ohmic value, depending upon the "take." Thus, for example, if the "take" is 6%, the correcting arm is set to 940 ohms; if the "take" is 10%, to 900 ohms; and if the "take" is 15%, to 850 ohms, each lesser ohmic value bearing a percentage relation to one thousand ohms the same as the amount available for distribution bears to the gross sum.

The maximum resistance in the balancing arm is arranged to be directly proportional to the maximum ohmic value of the correcting arm. Thus, if the correcting arm has a maximum value of 1,000 ohms, and the highest odds that the computer is capable of computing is 100 to 1, the balancing arm will have a maximum of 100,000 ohms. The balancing arm is preferably controlled by a so-called runaway relay chain, such as, for example, the chain shown in Patent No. 2,179,698 issued to Levy and Johnston, November 14, 1939; and upon operation, each relay in the chain reduces the resistance of the balancing arm until the bridge is brought into balance. While 1,000 and 100,000 ohmic values are convenient for use in the correcting and balancing arms respectively, other values may equally well be used within the teachings of the invention.

Since the adjustment of the correcting arm to correspond to that portion of the pool remaining after the "take" has been deducted, gross totals, as indicated by the adding machines of the totalisator, can be inserted directly into the total arm of the bridge and the odds indicated when the bridge is brought into balance are correct and are the same as if the "take" had been computed and deducted from the total sum before that sum is inserted in the total arm of the bridge. This arrangement permits faster computation of the approximate odds through the elimination of the steps of computing and deducting the take from the total on each cycle.

When the amount accumulated in the pool is sufficient to warrant indicating a line of odds, the computer is brought into operation and remains in operation throughout the remainder of the period during which tickets are sold in that particular pool. The operation is as follows:

*Starting the computer in automatic operation*

Figure 8:
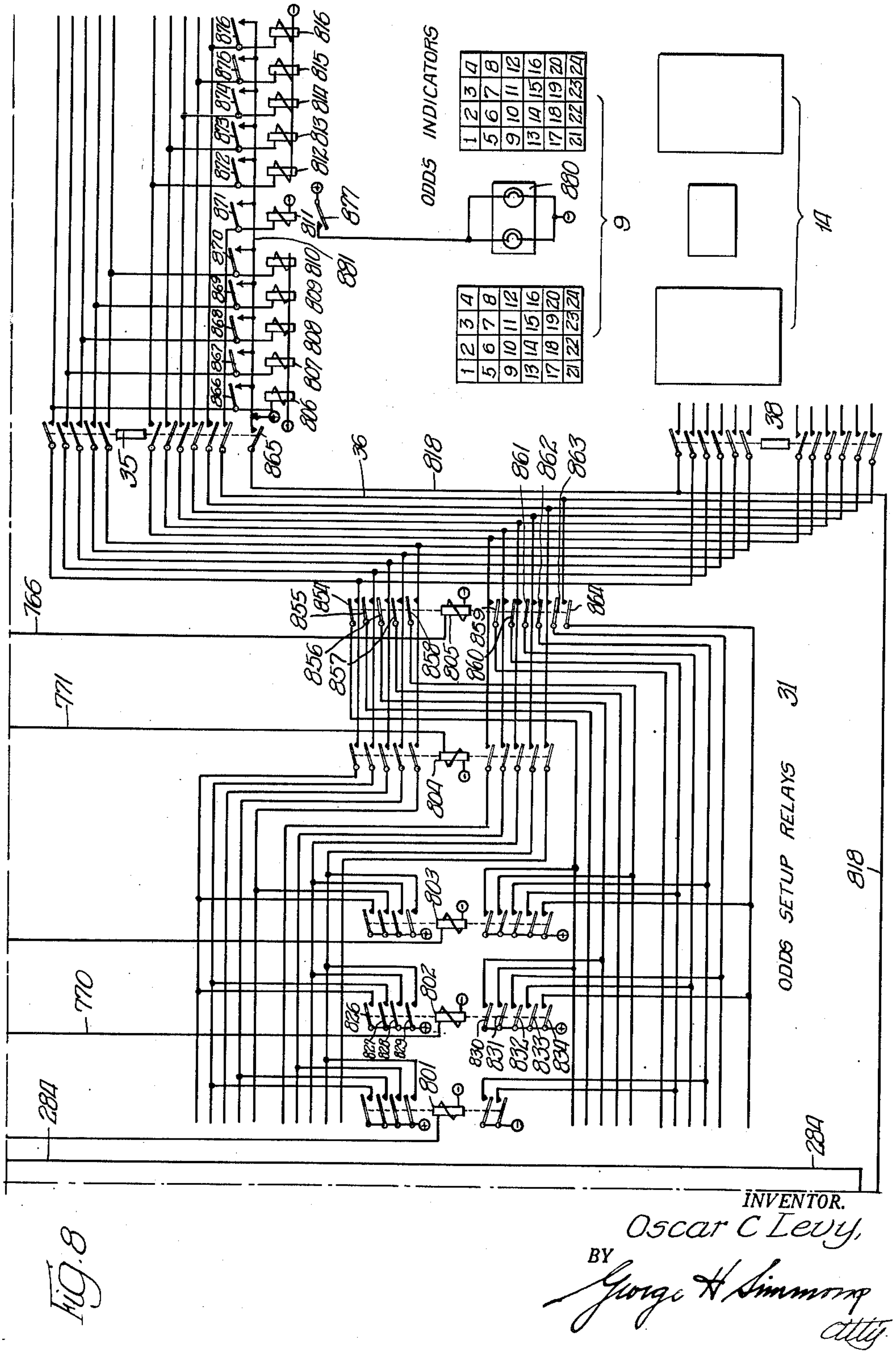
Fig. 8 is a schematic of the odds indicators and odds setup relays for controlling the same.
Figure 9:
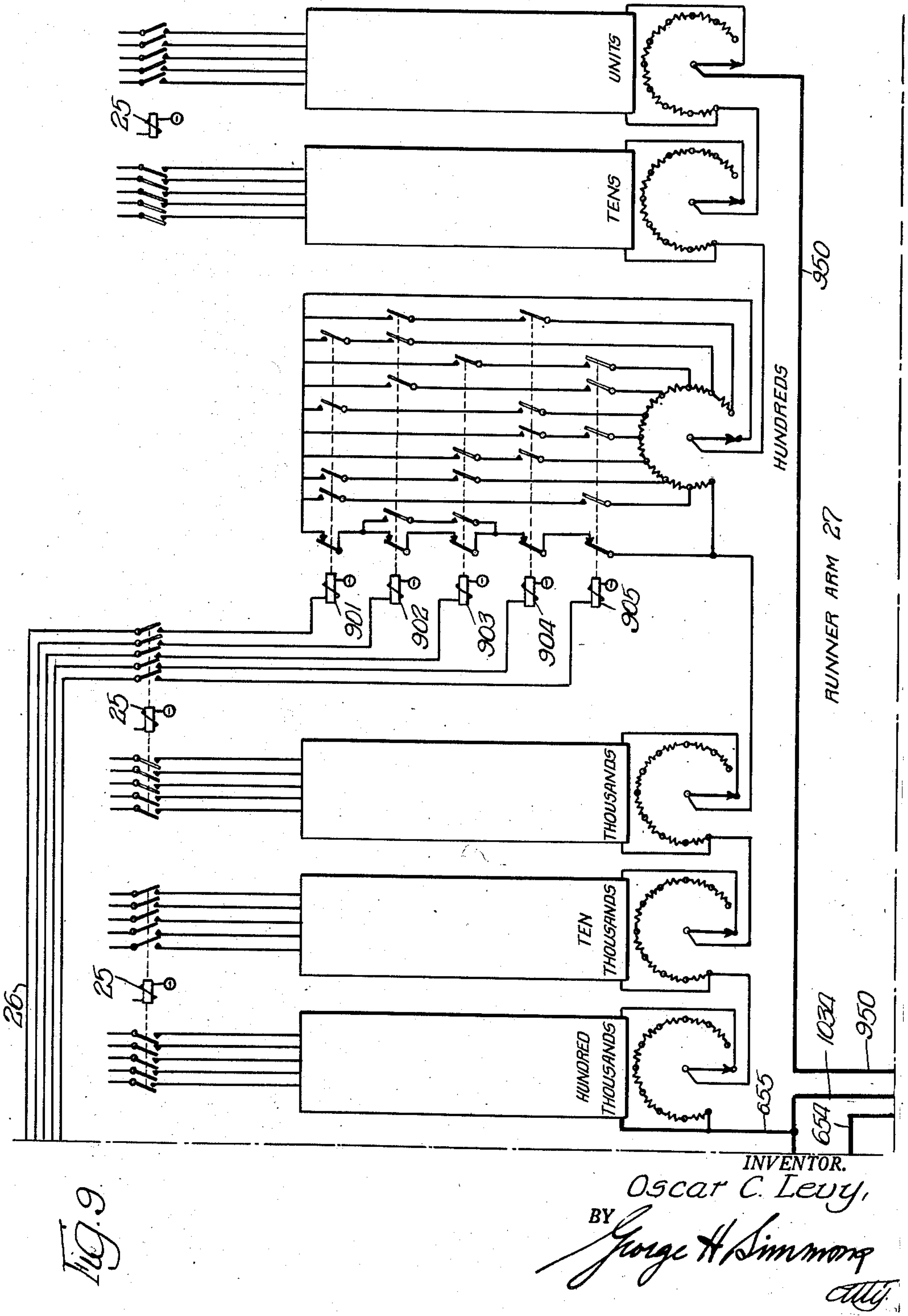
Fig. 9 is a schematic of the runner arm of the bridge and relays for setting the resistance thereof.
Figures 10, 11:
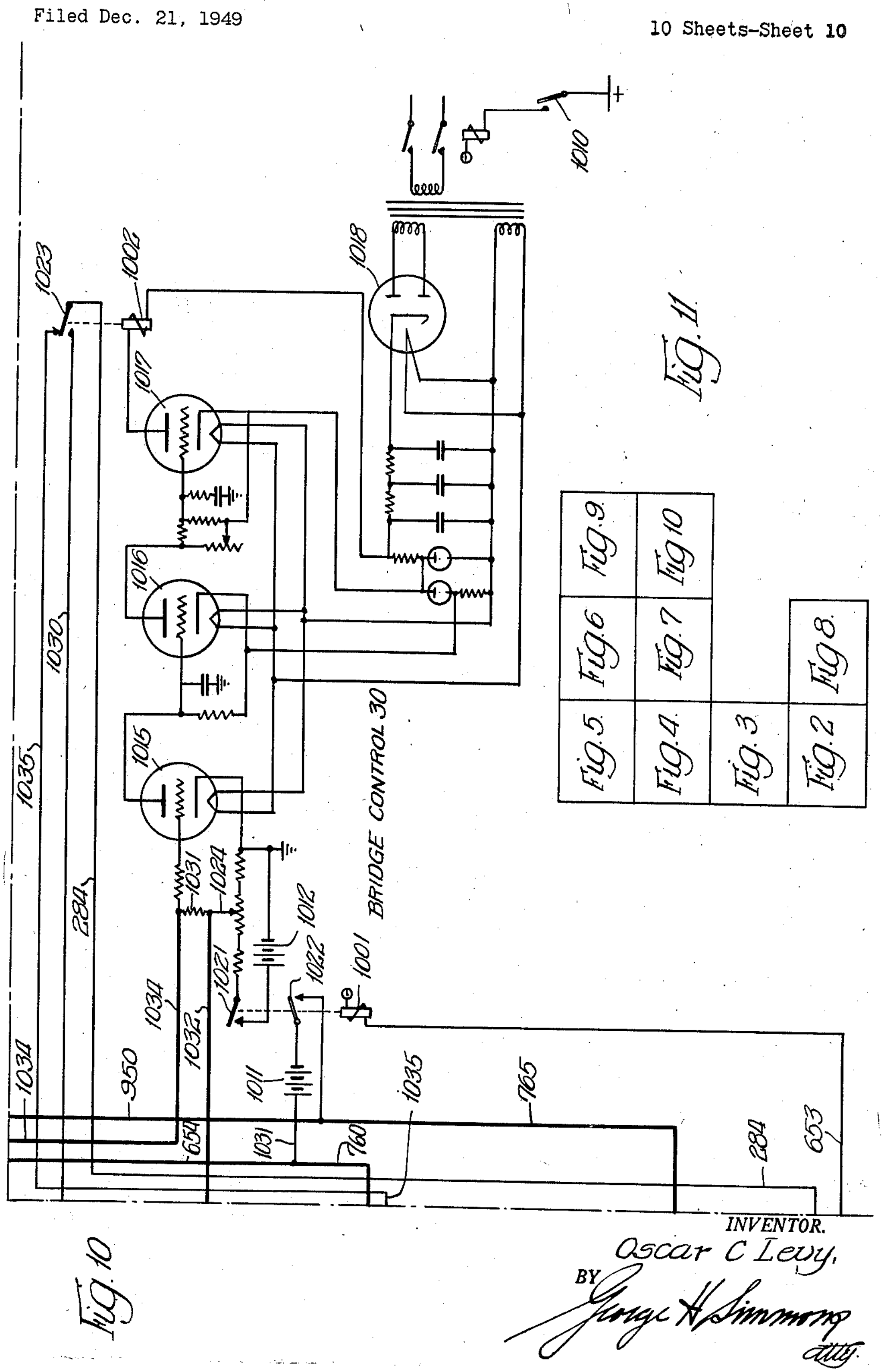
Fig. 10 is a schematic of the bridge control apparatus.
Fig. 11 is a diagram showing how Figs. 1 to 10, inclusive, fit together.

Referring now to Figs. 2 to 10, inclusive, which when fitted together in the manner shown in Fig. 11 show by customary schematic diagram sufficient details of the computer to enable one skilled in the art to understand the scope of the present invention.

Key 1010, Fig. 10, is closed to connect the source of commercial current to the amplifier equipment of the bridge control. In practice, this key is closed at the beginning of the day's operations and remains closed throughout the day so that the amplifier and rectifier equipment will be warm and ready when needed.

Figure 2:
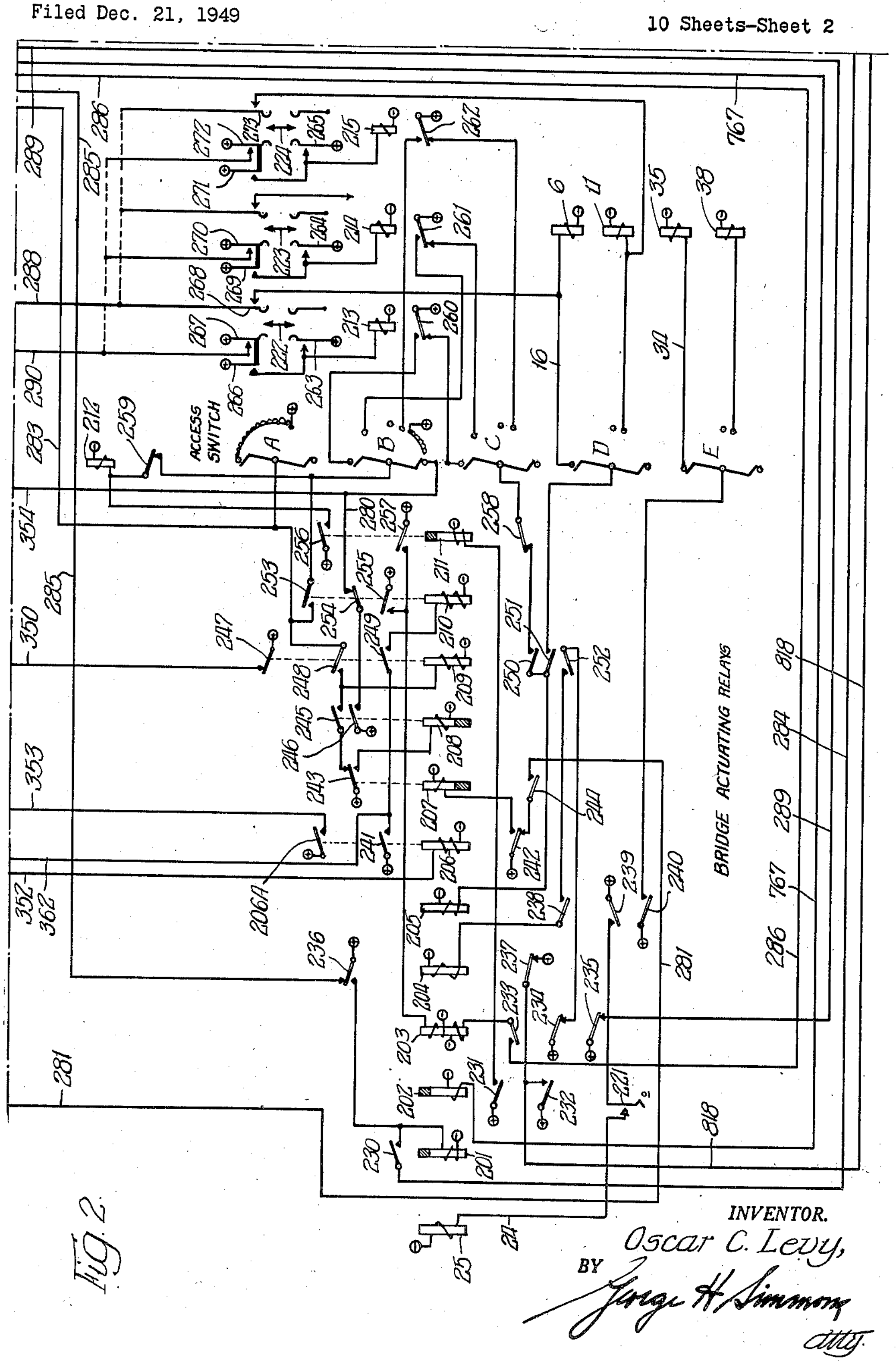
Fig. 2 is a schematic of the bridge actuating relays and associated apparatus.
Figure 3:
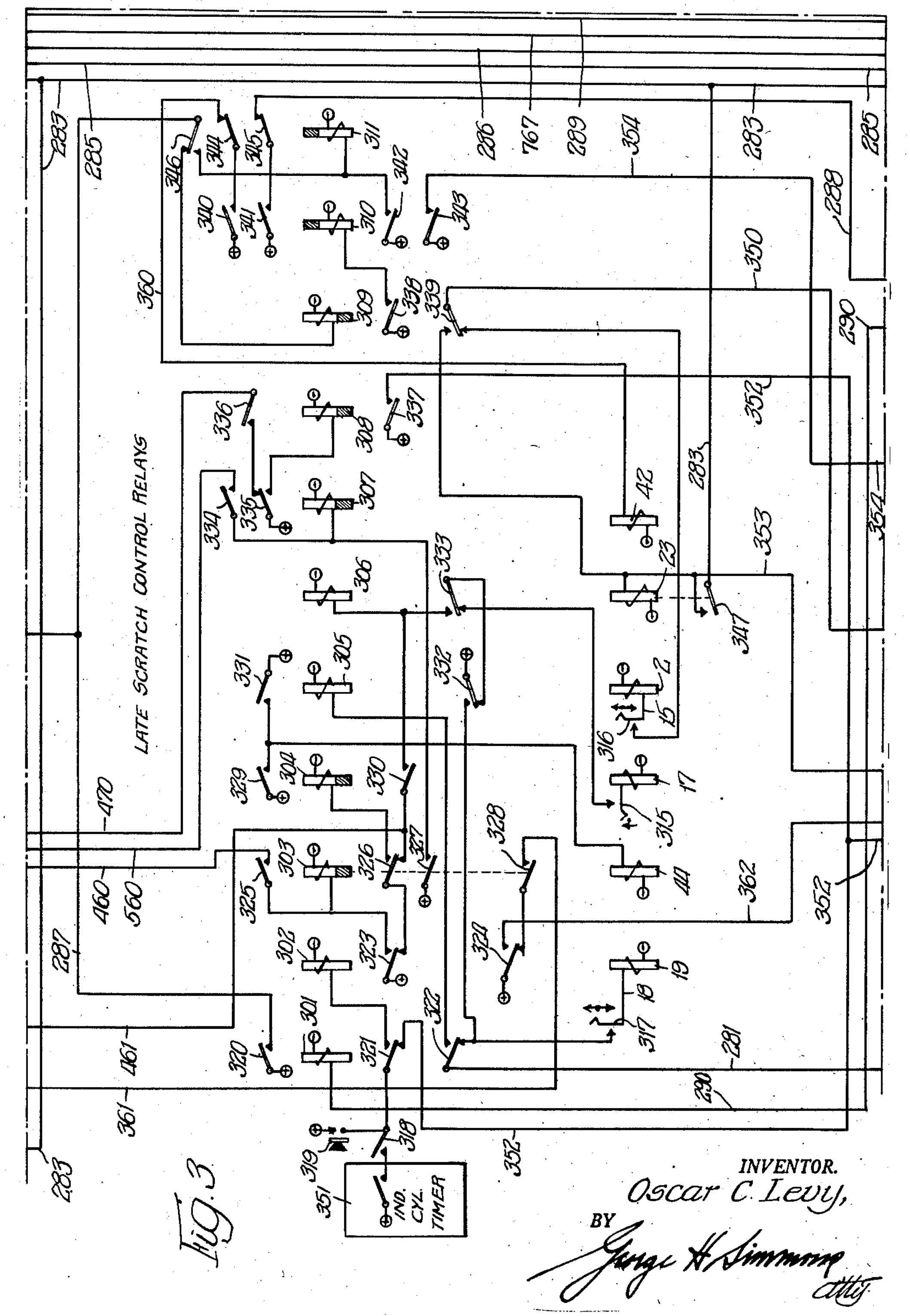
Fig. 3 is a schematic of the late scratch control relays and associated apparatus.

Manual key 318, Fig. 3, is the automatic operation switch shown in Fig. 1, and is closed when automatic operation of the computer is to be initiated. Manual keys 315, 316 and 317 and key 221, Fig. 2, are likewise closed at this time.

A circuit may now be traced from positive, spring 247 and its break contact, conductor 350, spring 339 and its break contact, key spring 316 and its make contact, conductor 15, through the winding of relay 2 (Fig. 3) to negative, operating relay 2 which connects the total indication bus 3 to the bus 4, as indicated in Fig. 1. A circuit may also be traced from positive through spring 332 and its break contact, spring 333 and its break contact, key spring 315 and its make contact, through the winding of relay 17 to negative, operating relay 17 which extends the indication bus 4 to the computer bus 20, as indicated in Fig. 1. The bus 20 at the moment is not connected to anything and no circuits are completed over it as yet.

At the next indication cycle, the totalisator timing device 351 (Fig. 3) will momentarily close a circuit which may be traced from positive at the timer, key spring 318 and its make contact, through spring 321 and its break contact, conductor 352, through the winding of relay 206 to negative, operating relay 206. A circuit may now be traced from positive on spring 206A, of relay 206, and its make contact, conductor 353, through the winding of relay 23, to negative, operating relay 23 to disconnect the manual controls effected by the odds man's keys.

Upon operating, relay 206 also closes a circuit from positive through spring 242 and its make contact, through the winding of slow-to-release relay 207 to negative, and relay 207 is operated over this circuit. Relay 207, at spring 243 and its make contact, closes a circuit from positive through slow-to-release relay 208 to negative, operating relay 208. Relay 208 closes spring 246 against its make contact, thereby closing a circuit extending from positive through spring 254 and its break contact, conductor 280, through the twentieth bank contact engaged by the B-wiper of the access switch, through the break contact of and spring 259, through the motor magnet 212 of the access switch to negative, operating the motor magnet which pulls up and opens the circuit just traced by moving spring 259 away from its break contact, thereby advancing the wipers of the switch one step from their twentieth to their first bank contacts. The access switch is the well known rotary type switch, having a plurality of wipers simultaneously stepped over their respective banks of contacts as the motor magnet de-energizes.

It will be noted that the first twelve contacts in the bank engaged by the wiper A of the access switch are connected to positive so that when the access switch steps into engagement with its first bank contacts, positive will be placed on locking conductor 283, which is connected to wiper A. At spring 347 and its make contact, relay 23 locks to conductor 283, so that once operated relay 23 remains operated until the access switch returns to normal, as will hereinafter appear.

*Placing the total in the total arm 21 of the bridge*

Figure 6:
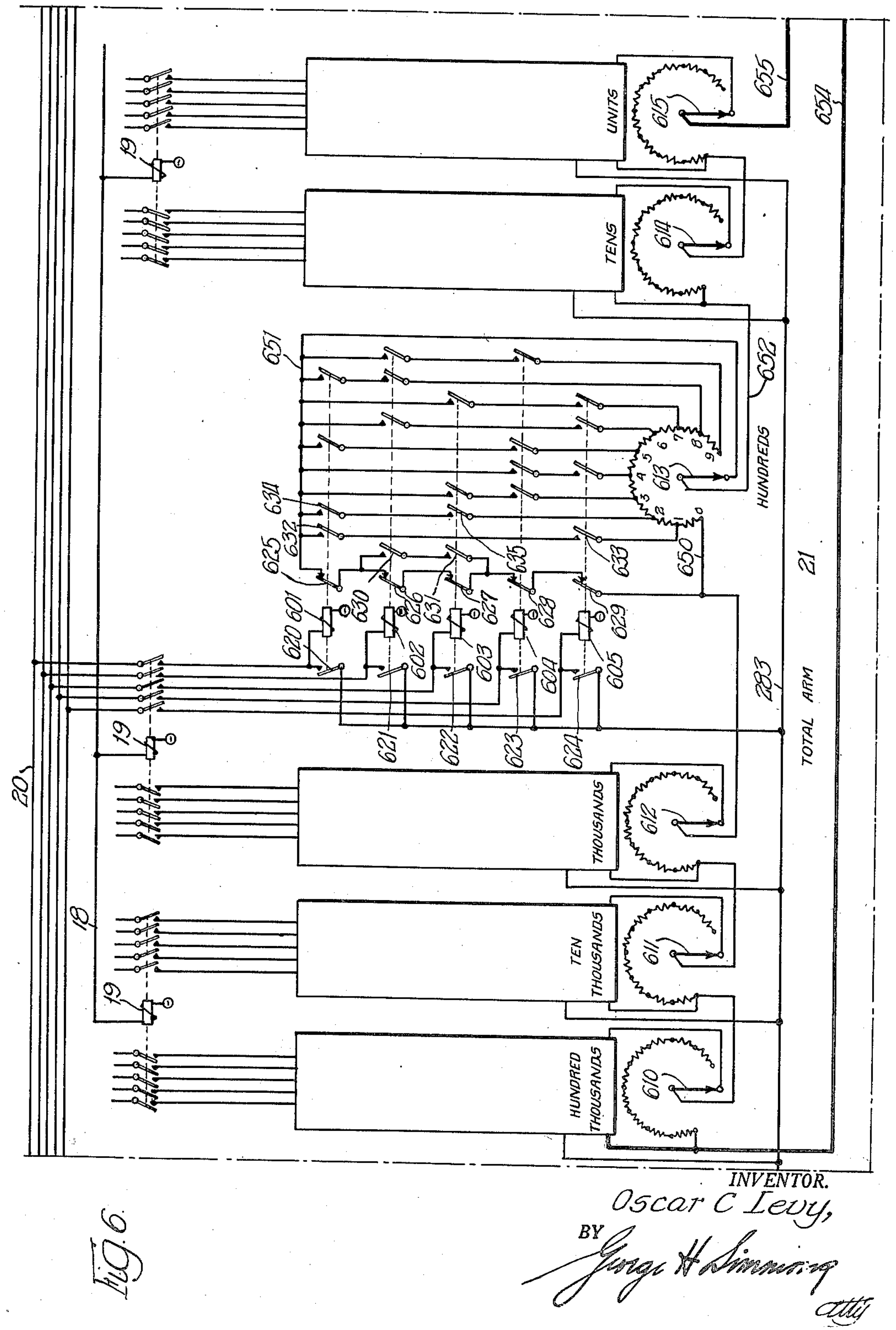
Fig. 6 is a schematic of the total arm of the bridge and relays for setting the resistance thereof.

After a short interval of time, the timer 351 opens its contacts thereby breaking the above traced circuit of relay 206 and that relay restores. A circuit may now be traced from positive through spring 242 and its break contact, spring 244 and its make contact, conductor 281, spring 322 and its break contact, key spring 317 and its make contact, conductor 18, through the winding of relay 19 to negative, operating relay 19. As will be seen in Fig. 1, relay 19 extends the computer bus 20 into the total arm 21 of the bridge. As will be seen in Fig. 6, the total arm of the bridge consists of a plurality of resistors that are connected together in series, there being a set of resistors for each digit of the totals to be placed in the bridge arm. Assuming that the resistance of the bridge is to be adjusted to one ohm per dollar value in the total, the units resistors engaged by manual arm 615 will consist of one ohm each, the tens digit resistors engaged by manual arm 614 will have a resistance of ten ohms each, the hundreds digit resistors engaged by manual arm 613 will have one hundred ohms each, the thousands digit resistors engaged by manual arm 612 will have one thousand ohms each, the ten-thousands digit resistors engaged by manual arm 611 will have ten thousand ohms each, and the one-hundred-thousands digit resistors engaged by manual arm 610 will have one hundred thousand ohms each; and further, each of these groups of resistors contains nine units. In Fig. 6, the relay arrangement for setting the resistance value has been fully illustrated in connection with the hundreds digit resistors, this relay arrangement being duplicated for each of the other digits. However, to avoid an unnecessary complication of the drawings, the relays for the other digits have been illustrated merely by a rectangle and it will be understood that that rectangle duplicates the relay arrangement shown.

Energization of relay 19, which as shown in Fig. 6 is three separate relays operating in parallel, extends each of the five wires of each digit section of bus 20 to the relay group controlling the corresponding digit resistors. If desired, relay 19 could consist of a single relay carrying the number of main springs and make contacts required to extend all of the digit sections of the bus to the relay groups. However, I prefer to use standard relays, each of which handles but two digits, as shown, and to connect such relays in parallel so that they function the same as a single relay.

Figure 5:
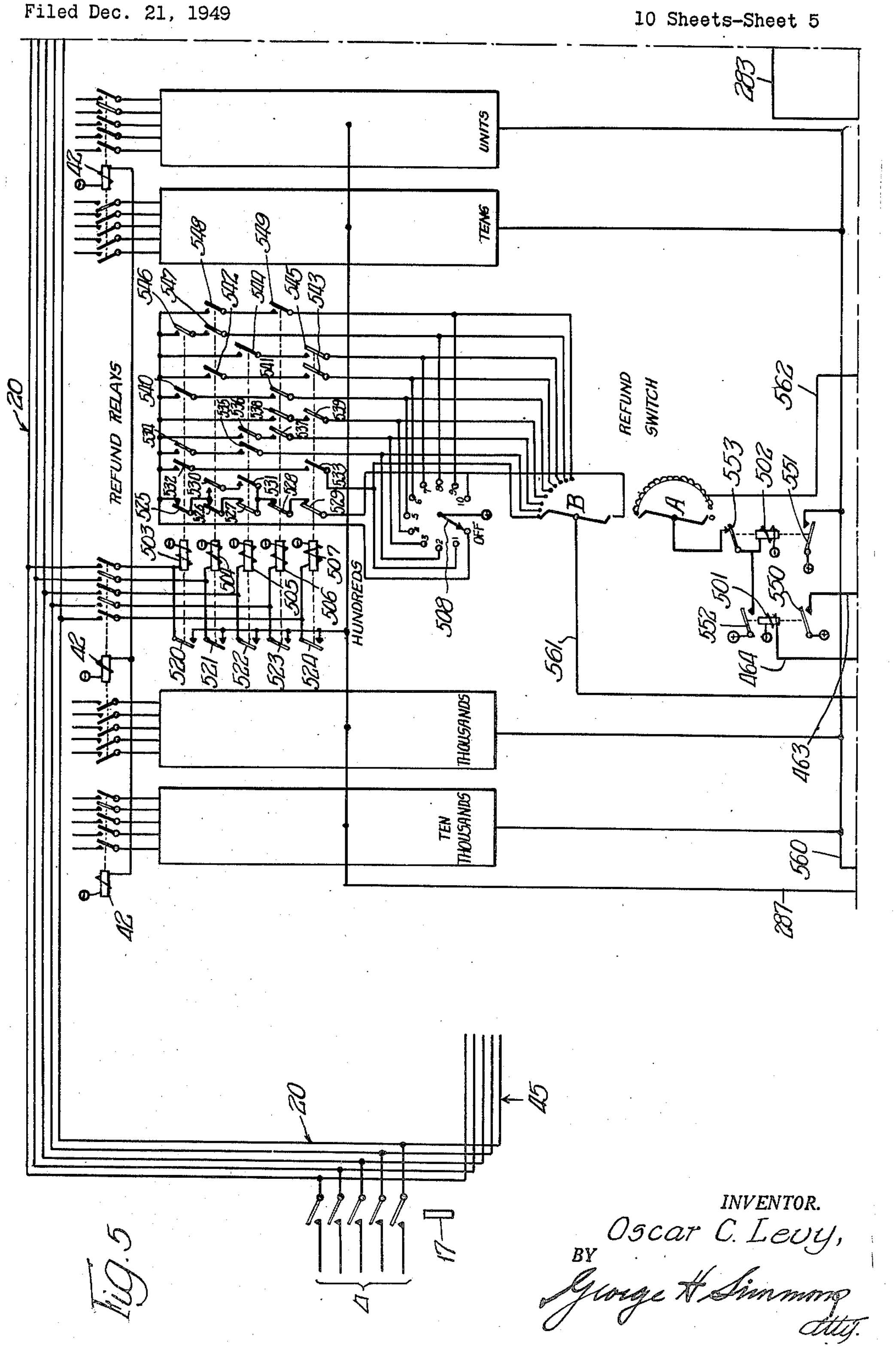
Fig. 5 is a schematic of the refund relays and refund switches.

In Figs. 5 and 6, only the hundreds digit section of the busses 4 and 20 is shown, and since the other sections of these busses duplicate this section a clear understanding of the arrangement may be had from what is shown. Relay 2 being operated as explained above, the bus 4 will be connected to the total indicator relays, and two of the five conductors in the hundreds section of the bus will carry positive potential. Relay 17 being operated as explained above, bus 4 will be connected to the computer bus 20 and the energization of relay 19 connects the total indicator relays to the total arm 21 of the bridge.

Assume for the moment that the sum in the total is such that the first (top) and fifth (bottom) conductors of the bus 20 carry positive potential, relay 19 extends the hundreds section of the bus 20 to relays 601 to 605, inclusive, and relays 601 and 605 will be operated over the obvious circuits.

A circuit may now be traced from terminal 650, through the first resistor, through springs 633 and 632 and their respective make contacts, conductor 651, manual arm 613 in its normal position, and conductor 652, to the tens digit resistor group.

Assume now that conductors 1 and 3 of the hundreds digit section of the bus 20 contain positive potential, relays 601 and 603 will be operated to close springs 634 and 635, and a circuit will be extended from contact 650 through the first and second resistance units in series and through the springs 634 and 635 and their respective make contacts to the conductor 651.

If the third and fourth conductors in the hundreds digit section of the bus contain positive potential, relays 603 and 604 will be operated and three sections of the resistance unit will be included in the circuit. If conductors 4 and 5 of the bus contain positive potential, relays 604 and 605 will be operated and four sections of the resistor unit will be included in the circuit. If conductors 1 and 4 contain positive, relays 601 and 604 will be operated, and by closing their respective springs against their make contacts, five sections of the resistance unit will be included in the circuit. When relays 602 and 605 are similarly operated, six units will be included in the circuit. When relays 603 and 605 are operated, seven units will be included in the circuit. When relays 601 and 602 are operated, eight resistance units will be included in the circuit, and relays 602 and 604 will include nine units in the circuit.

In case the hundreds digit of the total equals zero, the second and third conductors of the hundreds section of the bus will contain positive and relays 602 and 603 will operate, and no resistance units will be included, the circuit from contact 650 then extending through spring 629 and its break contact, spring 628 and its break contact, spring 631 and its make contact, spring 630 and its make contact, spring 625 and its break contact, conductor 651, and thence to the tens digit resistor as before. In the event that the sum to be registered does not total $100.00, none of the conductors in the hundreds digit section of the bus 20 will contain positive and the circuit from contacts 650 will be extended through the respective break contacts of springs 625, 626, 627, 628 and 629. Such a condition is not likely to occur in the hundreds digit but may frequently occur in the hundred-thousands and ten-thousands digits.

Whenever any one of the relays 601 to 605, inclusive, is operated, a locking circuit is closed from negative through the respective windings of the relays, a corresponding spring in the group 620 to 624, inclusive, conductor 283 through the A wiper of the access switch, now engaged with its first bank contact, to positive, holding the operated ones of relays 601 to 605, inclusive, in operated position until the access switch returns to normal.

*Disconnecting total arm 21 from computer bus*

Relay 206, upon restoring, also opens the previously traced circuit for slow-to-release relay 207, which does not immediately release or restore but rather remains in operated position long enough to permit energization of the relays 601 to 605 and similar relays by which the resistance of the total arm of the bridge is adjusted. At the end of this interval, relay 207 restores, opening the circuit to relay 19, previously traced, through spring 244 and its make contact, thereby permitting that relay to restore to disconnect the total arm of the bridge from the computer bus 20.

*Disconnecting total bus 3 from bus 4*

Restoration of relay 207 closes a circuit which may be traced from positive through spring 243 and its break contact, spring 245 and its make contact, through the winding of relay 209 to negative, operating relay 209. Relay 209, by closing spring 248 against its make contact, locks itself to the positive potential maintained on conductor 283, through wiper A of the access switch. Upon operating, relay 209 moves spring 247 away from its break contact, thereby opening the previously traced circuit for relay 2, permitting that relay to restore to disconnect the total bus 3 from the bus 4.

*Connecting runner indicator to runner arm 27 of bridge*

Operation of relay 209 closes a circuit which may be traced from positive through spring 260 and its break contact, the first bank contact engaged by wiper C of the access switch, spring 258 and its break contact, spring 250 and its make contact, and thence over parallel paths, the one leading through spring 251 and its make contact, through the D wiper of the access switch and its first bank contact, conductor 16, through the winding of relay 6 to negative, operating relay 6 which, as will be seen in Fig. 1, connects the first runner indicator bus 7 to the bus 4. The second of the parallel branches from spring 250 and its make contact extends through the winding of relay 205 to negative, operating relay 205.

A circuit may now be traced from positive through spring 239 of relay 205 and its make contact, key spring 221 and its make contact, conductor 24, through the winding of relay 25 to negative, operating relay 25, which, as will be seen in Figs. 1 and 9, connects the runner arm of the bridge to the extension 26 of the computer bus 20. Relay 25, like relay 19, preferably consists of three relays, each of which handles two digit sections of the bus. The first runner indicator bus 7 now being connected to the runner arm 27 on the bridge, and two of the relays in group 901 to 905, inclusive, will be operated, thereby to adjust the resistance of that bridge arm to a value representing one ohm per dollar value. In Fig. 9, as in Fig. 6, only the hundreds digits section of the bus is shown, the units, tens, thousands, ten-thousands, and hundred-thousands sections being diagrammatically illustrated; and it will be understood that when relays 25 are operated, two of the relays in each of the digits group will be operated simultaneously with the group 901 to 905, inclusive, thereby to set the total resistance in the arm to a value equal to the dollar value then registered on the first runner. The relays in this group remain in operated position only so long as relay 25 is operated and positive potential is maintained on the bus.

*Restoring odds indication on runnner Number 1*

Operation of relay 205 also closes a circuit which may be traced from positive through spring 240 and its make contact, through the E wiper of the access switch and its first bank contact, conductor 34, through relay 35 to negative, operating relay 35 which, as will be seen in Figs. 1 and 8, connects the odds indicator setup bus 36 to the first runner odds indicator 9. Operation of relay 205 also closes a circuit which may be traced from positive through spring 234 of relay 203 and its break contact, spring 252 of relay 209 and its make contact, spring 238 and its make contact, through the winding of relay 204 to negative, operating relay 204. Relay 204, upon operating, moves spring 237 away from its break contact, thereby removing positive potential from conductor 818 to release the operated ones of relays 806 to 816, inclusive, thereby to wipe out the previous odds indication, as will presently appear.

*Setting the correcting arm of the bridge*

Figure 7:
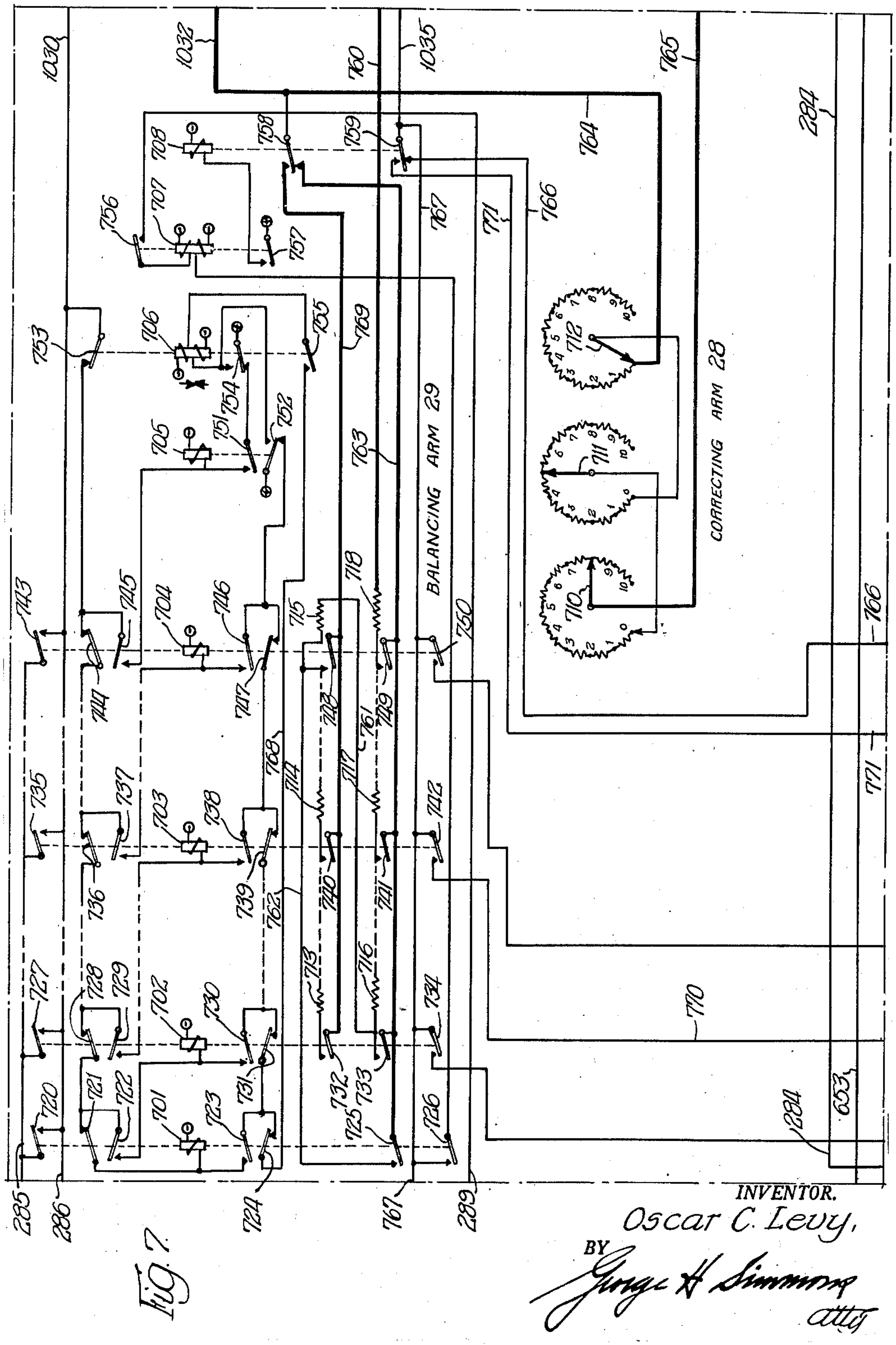
Fig. 7 is a schematic of the balancing and correcting arms of the bridge and of the chain relays by which the balancing arm is controlled.

The third or correcting arm 28 of the bridge is shown to comprise three variable resistors engaged by manually controlled contactors 710, 711, and 712 (Fig. 7). As shown in the drawing, this arm is adjusted to 850 ohms, indicating that the track deducts 15% of the pool. This value is set prior to the initiation of automatic operation and when once set remains fixed so long as the take of the track remains the same.

*The balancing arm 29 of the bridge*

The fourth arm 29 of the bridge comprises a plurality of resistors of which a part are shown at 713 to 718, inclusive, in Fig. 7. This plurality of resistors are connected in series and by-passed, one at a time, under the control of relays 701 to 706, inclusive, to vary the resistance value of the bridge arm. Normally the balancing arm of the bridge is open-circuited and is closed at the beginning of a balancing cycle, as will presently appear.

*Energizing the bridge*

The conductors which interconnect the four arms of the bridge are shown in heavy lines in Figs. 6, 7, 9 and 10. One end of the total arm 21 is connected through conductor 655 to one end of the individual runner arm 27 and the other end of this latter arm is connected by conductors 950 and 765 to one end of the correcting arm. The other end of the correcting arm is connected by conductor 764 to one end of the balancing arm, and the other end of the balancing arm is connected by conductors 760 and 654 to the other end of the total arm.

When wiper A of the access switch moved into engagement with the first contact in its bank to place positive on conductor 283, as explained hereinbefore, a circuit was completed from that positive over conductor 653 through the winding of relay 1001 to negative. Relay 1001 operates over this circuit and closes spring 1022 against its make contact. A circuit may now be traced from the positive terminal of battery 1011, conductor 1031, conductor 654, through the total arm 21, conductor 655, through the individual runner arm 27, conductor 950, spring 1022 and its make contact to the negative terminal of battery 1011. A parallel circuit extends from conductor 1031, through conductor 760, through the balancing arm 29, conductor 764, through the correcting arm 28, conductor 765, spring 1022 and its make contact to negative of battery 1011, but this circuit is incomplete at the moment since the balancing arm is open-circuited.

*The bridge balance testing equipment*

Connected to the junction of the correcting and balancing arms of the bridge is a conductor 1032 which is connected through resistor 1031 and conductor 1034 to the junction of the total and individual runner arms of the bridge. When the bridge is in balance, the potential on the two ends of resistor 1031 will be the same and when the bridge is unbalanced there will be a potential drop across the resistor.

As shown in Fig. 10, a vacuum tube amplifier consisting of tubes 1015, 1016, and 1017 are connected together and to a source of rectified power supplied by tube 1018. A test relay 1002 is connected in the plate circuit of the last one 1017 of the tubes, and the grid of the first one 1015 of the tubes is connected to one end of the resistor 1031. When relay 1001 operates, spring 1021 is closed against its make contact and battery 1012 is thus connected across the grid biasing resistors. By manipulation of potentiometer arm 1024, the basic potential applied to the grid of tube 1015 can be varied, thereby to control the cut-off point of the amplifier. The particular amplifier arrangement shown is by way of example only, as the particular type used is not of the essence of the present invention. So long as the amplifier maintains relay 1002 operated when the bridge is unbalanced and restores the relay when the bridge is in balance or substantially in balance, the requirements of the invention are fully met.

*Closing the bridge and making the initial test for range*

Operation of relay 204, as hereinbefore explained, also closes a circuit from positive through spring 236 and its make contact, through the winding of relay 201 to negative. Relay 201 having a copper slug on the armature end of its core, as indicated by the cross-hatching at the top of the core, is slow to pull up and does not immediately operate, this delay allowing the relay group controlling the runner arm of the bridge to be operated before relay 201 operates. Relay 201, upon operating, extends the positive just extended through spring 236 and its make contact, through spring 230 and its make contact, conductor 284, to main spring 1023 of test relay 1002 (Fig. 10). The bridge at the moment is incomplete since only three arms of it are now closed; consequently the bridge is out of balance and relay 1002 is in operated position. The positive thereby placed on spring 1023 is extended through the make contact engaged by this spring, conductor 1030, through spring 753 and its break contact, spring 744 and its break contact, thence through corresponding break contacts on intervening relays to spring 736 and its break contact and corresponding contacts on intervening relays to spring 728 and its break contact, through spring 721 and its break contact, through the winding of relay 701 to negative. Relay 701 operates over this circuit and at spring 723 and its make contact establishes a locking circuit for itself which may be traced through springs 731, 739, and 747 and their respective break contacts, through spring 752 and its break contact to positive. Relay 701, by closing spring 725 against its make contact, completes the balancing arm of the bridge. The balancing arm now extends from spring 758 and its break contact, conductor 763, through spring 725 and its make contact, conductor 762, resistor 715, conductor 761, resistors 716, 717, and 718, and the intervening resistors not shown, to conductor 760.

In Fig. 7, the end ones of the test relay chain, relays 702 and 704, are indicated with one intervening relay 703 disposed therebetween. In American practice, a large number of odds are indicated, and in one instance they relay chain in the balancing arm comprises 27 relays, of which relays 701 to 704, inclusive, are a part. Each of the relays 702 to 704, inclusive, will handle two odds values, as will presently appear, so that a total of fifty-two odds indications can be made, depending upon the point at which the bridge is brought into balance.

The operation at this point depends upon whether or not the odds are below ten to one or above ten to one. If they are below ten to one, the bridge will be unbalanced to such an extent that the test circuit will maintain grid potentials through the amplifier, at such values as to maintain the test relay 1002 operated. If the odds are greater than ten to one, the test circuit will adjust the grid potentials so as to block off current flow in the plate circuit leading through test relay 1002 and that relay will fall back to operate the range relay so as to test in the high odds range. Assume for the moment that the odds to be computed from the values now placed in the total and runner arm fall below ten to one.

*Balancing the bridge in low odds range*

Since the values in the total and runner arms of the bridge are such that the odds are in the low range, test relay 1002 will remain in operated position and the positive previously traced to conductor 1030 will be maintained upon that conductor. The operation of relay 701 therefore closes a circuit from this positive through the previously traced chain of contacts leading to spring 721, thence through spring 722 and its make contact, through the winding of relay 702 to negative, operating that relay which locks itself through spring 730 to the locking chain previously traced to spring 723 of relay 701. At spring 728 relay 702 opens the previously traced circuit to relay 701, and by opening spring 731 from its break contact, opens the locking chain for relay 701, permitting that relay to restore.

At spring 733, which moves into engagement with its make contact when relay 702 operates, that relay removes resistor 715 from the balancing arm of the bridge, thereby altering the potential across the terminals of resistor 1031. Relay 702 thus varies the resistance in the balancing arm of the bridge to test for odds of nine to one when operating in the lower odds range. Assuming that the odds at the moment are less than nine to one, test relay 1002 will remain operated and through spring 729 of relay 702 and its make contact the driving chain will be extended to the next relay in the group, operating that relay which locks itself in the manner of relay 702 which breaks the energizing and locking chain to relay 702 and by-passes the next resistance in the balancing arm, such as, for example, resistance 716. Thus operation continues through the intervening relays until the circuit is extended through relay 703 which operates, and at spring 738 and its make contact locks to the locking chain, and at springs 736 and 739 breaks the operating and locking chains to the preceding relay.

At spring 741, relay 703 by-passes another resistor in the balancing arm, and assuming that the bridge is now in actual balance or near enough to actual balance to cause the potential drop across resistor 1031 to block off the plate current to relay 1002, that relay will restore, and by moving its spring 1023 from its make contact, removes positive from the driving chain conductor 1030, thereby preventing the energization of the next test relay in the chain. Relay 1002 is a high speed relay and will restore before the next relay in the chain can operate, even though the circuit for that relay is closed the instant relay 703 operates.

*Changing the odds indicator*

Spring 1023, moving into engagement with its break contact, places positive on conductor 1035, closing a circuit which may be traced through spring 759 and its break contact, conductor 766, through the winding of relay 805 to negative, operating relay 805 which connects the low range odds setup bus to the odds setup bus 36 (Figs. 1 and 8). The positive on conductor 1035 also closes a circuit over conductor 767, through spring 742 of relay 703 and its make contact, conductor 770, through the winding of odds setup relay 802 to negative, energizing relay 802.

A circuit may now be traced from positive through spring 830 of relay 802 and its make contact, the third conductor in the tens digit bus, spring 856 of relay 805 and its make contact, the third conductor in the tens digit section of bus 36, through the make contacts of relay 35, through the winding of relay 808 to negative, operating relay 808.

A second circuit may now be traced from positive through spring 831 of relay 802 and its make contact, through the first conductor in the tens bus, through spring 854 and its make contact, the first conductor in the tens digit section of bus 36, through the make contacts of relay 35, through the winding of relay 806 to negative, operating relay 806.

With relays 806 and 808 operated, circuits are closed to cause the tens digit indicator of indicator 9 to display the number 7. Arrangements for causing these relays to display this digit form no part of the present invention, being more fully disclosed in the above mentioned co-pending application of Johnston.

A circuit may also now be traced from positive through spring 832 and its make contact, through the fifth conductor in the units bus, spring 863 and its make contact, the fifth conductor in the units section of the bus 36, through the make contacts of relay 35, through the winding of relay 816 to negative, operating relay 816.

A circuit may also be traced from positive through spring 833 and its make contact, through the third conductor in the units bus, through spring 861 and its make contact, the third conductor of units section of bus 36, through the make contacts of relay 35, through the winding of relay 814 to negative, operating relay 814. Simultaneous operation of relays 814 and 816 sets the units section of the indicator 9 to indicate the digit 2.

A circuit may now also be traced from positive through spring 834 and its make contact, the dash conductor, spring 869 and its make contact, through the make contacts of relay 35, through the winding of relay 811 to negative, operating relay 811 which closes spring 877 against its make contact, thereby to close the obvious circuit to connect the dash lamps 880 across the source of current, thereby to light these lamps. Indicator 9 therefore now indicates 7 to 2 as the approximate odds on runner number one.

*Locking the odds indicator relays*

The positive potential previously traced to conductor 767 is extended through the winding of relay 202 to negative. Relay 202 being slow to operate, as indicated by the cross-hatching of the upper end of its core, does not immediately operate, but delays long enough to complete the foregoing operations of setting the odds indicator 9. When relay 202 operates, spring 232 is closed against its make contact, thereby extending a circuit over conductor 818 through armature spring 865 of relay 35, and the main spring now engaged thereby, conductor 881, through spring 866 and its make contact, to lock relay 806 in operated position, and through spring 868 and its make contact to lock relay 808 in operated position, and through spring 874 and its make contact to lock relay 814 in operated position, and through spring 876 and its make contact to lock relay 816 in its operated position, and through spring 871 and its make contact to lock relay 811 in its operated position.

*Balancing the bridge in high odds range*

If the value on a particular runner is small, so that the approximate odds are greater than 9 to 1 when relay 701 is operated to close the bridge and make the initial test for balance as explained above, the potential across resistor 1031 will be of such value and sign as to cause relay 1002 to restore momentarily, whereupon the positive previously traced over conductor 284 to spring 1023 will be removed from conductor 1030 to momentarily stop the chain and extended to conductor 1035, through conductor 767, through spring 726 and its make contact, through the lower winding of relay 707 to negative, operating relay 707. A circuit may now be traced from positive through spring 235 and its break contact (Fig. 2), conductor 289, through spring 756 and its make contact, through the upper winding of relay 707 to negative, locking relay 707 in its operated position.

At spring 757 and its make contact, relay 707 closes a circuit from positive through the winding of relay 708 to negative, operating that relay. Spring 758 is thereby moved from its break to its make contact, thereby transferring the bridge circuit from conductor 763 to conductor 769 and the bridge arm is thereby open-circuited. The potential across resistor 1031 is thus increased, relay 1002 re-operates and positive is re-applied to conductor 1030, thereby to re-start the chain and the previously traced circuit for relay 702 is established and that relay operated as before.

The balancing arm of the bridge is closed as soon as relay 702 operates, and extends from the junction of conductors 1032 and 764, through spring 758 and its make contact, conductor 769, through spring 732 and its make contact, through resistors 713, 714 and 715 and the intervening resistors, not shown, in series, conductor 761, resistors 716, 717 and 718 and the intervening resistors, not shown, in series, conductor 760, to the junction of conductors 654 and 1031.

As the chain relays operate sequentially, resistors between 713 and 715 are by-passed one at a time as before, and when the bridge is brought into balance relay 1002 will again restore and remove positive from conductor 1030 to stop the chain and apply positive to conductor 1035. Assume for the moment that the chain is in balance when relay 703 is operated. The positive on conductor 1035 will be extended through spring 759 and its make contact, conductor 771, through the winding of relay 804 to negative, operating that relay which connects the spring combinations on the upper ends of relays 801 to 803, inclusive, to the odds setup bus 36. A circuit may also be traced over conductor 767 through spring 742 and its make contact, conductor 770, through the winding of relay 802 to negative, operating that relay which at springs 826 and 827 applies positive to the first and second conductors in the tens section of the odds indicator bus, thereby to operate relays 806 and 807 to set the tens indicator to indicate the digit 4.

At springs 828 and 829, relay 802 applies positive to the third and fourth conductors of the units section of the odds indicator bus, thereby operating relays 814 and 815 to set the units indicator to zero thereby to indicate the odds of 40 to 1 on the runner. The locking and other operations of the odds setup relays and indicators are the same as hereinbefore explained and need not be repeated.

*Releasing runner Number 1 from the bridge and connecting Number 2 thereto*

Operation of relay 202 also closes a circuit from positive through spring 231 and its make contact, through the winding of relay 211 to negative, operating relay 211 after a brief interval, since relay 211 is slow to operate as indicated by the cross-hatching at the upper end of its core.

Operation of 211 closes a circuit from positive through spring 256 and its make contact, through the winding of magnet 212 of the access switch, operating that magnet preparatory to advancing the wipers of the switch from their first to their second bank contacts.

Operation of relay 211 moves spring 258 away from its break contact, thereby breaking the previously traced circuit for relay 6, permitting that relay to restore, thereby to disconnect the runner number one indicator bus 7 from the bus 4. Spring 258 also opens the previously traced circuit for relay 205 which restores immediately, and by opening spring 240 from its make contact breaks the previously traced circuit for relay 35, permitting that relay to restore.

Restoration of relay 35 transfers the locking circuit on conductor 881 from conductor 818 to positive on the break contact. The spring combination controlled by armature spring 865 being a make-before-break combination, this locking circuit is maintained and the relays in group 806—816, which are operated, are consequently maintained to maintain the odds indication which has been set up.

Restoration of relay 205 opens spring 239 from its make contact, thereby opening the previously traced circuit for relay 25, to disconnect the control relays in the runner arm of the bridge from the extension 26 of bus 20. It will be noted that the relays in group 901—905, inclusive, heretofore operated to set the resistance of the runner arm, contain no locking springs, and consequently upon the restoration of relay 25 the operated ones of relays 901 to 905, inclusive, and of the other relays controlling the other digits in the runner arm, all restore to normal, thereby restoring the resistance of the runner arm to zero.

Operation of relay 211, as above, also closes a circuit which may be traced from positive through spring 257 and its make contact, through the upper winding of relay 203 to negative.

Restoration of relay 205, by opening spring 238 from its make contact, breaks the previously traced circuit for relay 204, permitting that relay to restore. Restoration of relay 204 closes a circuit through spring 236 and its break contact, conductor 285, through spring 735 of relay 703 and its make contact, and thence over parallel paths, the one over conductor 286, through spring 233 of relay 203 and its make contact, through the lower winding of relay 203 to negative, thereby to maintain relay 203 operated until the chain relays are restored to normal. The second parallel branch from spring 735 and its make contact reapplies positive to drive conductor 1030, whereupon the chain circuit will be extended through spring 737 and its make contact to the next relay in the chain, and the chain will run out until relay 704 is operated, at which time, through spring 745 and its make contact, relay 704 will close a circuit through the winding of relay 705 to negative, operating relay 705 which locks itself through spring 751 and its make contact through spring 754 and its break contact to positive. By moving spring 752 from its break contact, relay 705 breaks the previously traced locking circuit, permitting locked relays in the chain to restore. Spring 752, moving into engagement with its make contact, closes a circuit from positive through the lower winding of relay 706 to negative, operating relay 706 which, through spring 754 and its make contact, locks itself to positive through its lower winding. Spring 754, moving from its break contact, opens the locking circuit for relay 705 which restores.

As soon as all the relays in the chain have restored, a circuit may be traced from positive through spring 752 and its break contact, through the break contacts of springs 747, 739, and 731 in the locking chain, through spring 724 and its break contact, conductor 768, through spring 755 and its make contact, through the upper winding of relay 706 to negative. Relay 706 being differentially wound, as indicated by the opposed arrows, restores when both of its windings are energized.

The individual runner arm of the bridge now being at zero resistance, the total arm of the bridge now having the resistance corresponding to the value of the last total registered therein, the balancing arm of the bridge now being open and the correcting arm closed, the bridge will be unbalanced and test relay 1002 will re-operate. Spring 1023 moves out of engagement with its break contact and into engagement with its make contact.

Restoration of relay 204 opens the previously traced circuit for relay 201 and by moving spring 230 away from its make contact removes positive from conductor 284, thereby to remove positive from the spring 1023, and in turn from the driving conductor 1030, so that the chain remains inactive.

Removal of positive from conductor 284 also removes positive from conductor 767 opening the previously traced circuit for relay 202, which restores, and the previously traced circuit for relay 802 which also restores; and also removes positive from conductor 766 to open the circuit of relay 805 which likewise restores.

Restoration of relay 202 opens the previously traced circuit for relay 211, which restores, and at springs 257 opens the circuit through the upper winding of relay 203. If the chain has restored to the point where the circuit through the lower winding of relay 203 has been opened, as by the opening of contacts 743, relay 203 restores. At spring 256, relay 211 opens the circuit of magnet 212 of the access switch, permitting that magnet to restore and advance the wipers of the switch from their first to their second bank contacts. At spring 258 relay 211 prepares the previously traced circuit from wiper C of the access switch to relay 205 and through wiper D to the bus connecting relay such as 6.

*Determining odds on next runner*

Assuming that runner number two has not been scratched. When wiper C of the access switch engages its second bank contact, it will find positive and the cycle will be initiated again by the energization of relay 205. Wiper D of the access switch will extend a circuit to the relay (not shown) that is connected to its second bank contact. This relay connects the bus 4 to the second runner section of the adding machine, and relays 17 and 25 extend this bus to the runner arm 27 of the bridge, to set in that arm a resistance value indicative of the amount then registered on that runner. Through wiper E, the access switch extends positive through its second bank contact to a relay (not shown) by which the odds indicator for runner number two is connected to the odds setup relays. The bridge is then closed and balanced and the odds indication set up as before. At the completion of the cycle on runner number two, the access switch is re-operated to advance its wipers to the third contacts in the bank and the cycle again repeated.

*Scratched runners*

As will be seen in Fig. 2, in the example shown, the access switch is capable of connecting the calculator to a maximum of twelve runners. It frequently happens that a smaller number of runners is encountered. Assume for the moment that there is no runner 12. At the beginning of the sale of tickets, the attendant will operate scratch keys such as 222 to 224, for each number that does not have a runner. Since there is no Number 12 runner, key 224 will be operated to move its spring 265 against its make contact. A circuit may now be traced from positive on keyspring 265, through the winding of relay 215 to negative. Relay 215 operates over this circuit moving spring 262 away from its break contact, thereby to remove positive from the twelfth contact in the bank engaged by wiper C of the access switch. The previously traced circuits through wiper C therefore cannot be closed. Spring 262 moves into engagement with its make contact, thereby applying positive to the twelfth contact of the bank engaged by wiper B of the access switch. A circuit may now be traced from positive on the twelfth bank contact, wiper B, spring 259 and its break contact, magnet 212 to negative. Magnet 212 operates over this circuit and by moving spring 259 from its break contact interrupts its own circuit and falls back to advance the wipers from the twelfth to the thirteenth contacts in the banks. Thus the computer is made to skip runner numbers when there are no tickets sold on those numbers.

*Restoring the computer*

As will be seen in Fig. 2 in the bank engaged by wiper B of the access switch, contacts 13 to 19, inclusive, are connected together and permanently connected to positive. Thus, whenever wiper B moves into engagement with the thirteenth contact, the above circuit for the magnet 212 will be closed through the wiper and interrupted by spring 259, and the access switch will operate automatically until wiper B engages its twentieth bank contact which is not connected to positive.

It will also be noted that the first twelve contacts in the bank engaged by wiper A of the access switch are connected together and to positive. When the switch moves from the twelfth to the thirteenth contact, relay 209, which was locked in operated position through wiper A, will restore, thereby to restore the computer to normal where it remains until the next impulse is received from the indicator cycle timer 351. Removal of positive from wiper A removes positive from conductor 283 and all relays locked to that conductor will restore. The energized relays in the group 601 to 605, inclusive, restore to restore the total arm of the bridge, and relay 23 restores to return the indicators to the control of the odds man's keys.

*Late scratch*

It may happen that after a number of tickets on a particular runner have been sold, that runner may be scratched. In such case the tickets sold on a scratched runner are redeemable and the value of those tickets may appreciably affect the odds on other runners. In such case, when the late scratch is made, the totalisator is momentarily stopped and the odds computer momentarily stopped, during which interval the sum then registered in the totalisator on the scratched runner is transferred to storage relays and the computer adjusted so as to cause it to correct the total displayed at each successive indication cycle prior to placing that total in the runner arm of the bridge. The operation is as follows:

*Setting the computer for late scratch*

The indication cycle key 318 is opened to disconnect the indication cycle timer from the control relay. The key corresponding to the late scratch—for the moment assume it to be key 222—will be operated to close the upper set of springs 266, 267 and 268 against their respective make contacts thereby to scratch runner Number 1. A circuit may now be traced from positive through spring 266 and its make contact, through the winding of relay 213 to negative, operating that relay which at spring 260 and its break contact removes positive potential from the first contact in the access switch bank engaged by wiper C and at spring 260 and its make contact applies positive to the first contact in the bank engaged by wiper B thereby to cause the access switch to skip runner Number 1 in future cycles.

At spring 267 and its make contact, positive is applied to conductor 290, thereby to complete the circuit through the winding of relay 301 to negative, relay 301 operating over this circuit. Push button 319 is then closed to extend a circuit from positive through spring 321 and its make contact, through the winding of relay 302 to negative, operating relay 302. A circuit may now be traced from positive through spring 323 and its make contact, through the winding of relay 303 to negative, operating relay 303.

At spring 327 and its make contact, relay 303 closes a circuit from positive through the winding of relay 307 to negative, operating relay 307 which, at spring 335 and its make contact, closes a circuit through relay 308 to negative, operating relay 308.

At spring 320 and its make contact, relay 301 closes a circuit from positive over conductor 287, through spring 346 and its break contact, through the winding of relay 309 to negative, operating relay 309 which at spring 339 and its break contact opens a previously traced circuit for relay 2 which restores to disconnect the total bus 3 from the bus 4.

At spring 339 and its make contact, relay 309 closes a circuit from positive placed on conductor 350 by spring 247 and its break contact, through the winding of relay 23 to negative, operating relay 23 to move control of the indicators from manual to automatic.

At spring 338, relay 309 closes a circuit from positive through slow operating relay 310 to negative, causing relay 310 to operate after a brief interval.

At spring 340 relay 310 closes a circuit from positive through spring 344 and its break contact, conductor 360, through the windings of relays 42 to negative, operating relays 42 which connect the computer bus 20 to the refund relay group.

At spring 341 and its make contact, relay 310 closes a circuit from positive, through spring 345 and its break contact, conductor 288, key spring 268 and its make contact, through the winding of relay 6 to negative, operating relay 6 which connects the number one runner bus 7 to the bus 4. Relay 17 being operated over the previously traced circuit from positive through springs 332 and 333 and their respective break contacts, the runner bus 7 will be connected to the refund relays.

*Registering refund sum in refund relays*

In Fig. 5, the refund relays are shown to consist of five relays per digit, of which only relays 503 to 507, inclusive, are shown, these relays controlling the hundreds digit of the sum. Two of the relays will be operated to register the hundreds digit in the refund relays, and simultaneously two relays in each of the other digit sections of the refund register will be simultaneously operated. Positive previously traced on conductor 287 is extended through the make contacts 520 to 524, inclusive, of the operated relays, thereby to lock those relays in operated position to retain the refund sum in the register.

At spring 343 and its make contact, relay 310 closes a circuit from positive through conductor 354, the twentieth contact of the bank of the access switch engaged by wiper B, through spring 259 and its break contact, through the winding of magnet 212 to negative, operating that magnet which opens spring 259 to advance the access switch to its first bank contacts. Since relay 213 is operated, and positive placed on the first bank contact engaged by wiper B, the above circuit for magnet 212 will again be closed and the switch will take another step, coming to rest on its second bank contact.

At spring 342, relay 310 closes a circuit through the winding of relay 311 to negative, operating that relay. Relay 311 having a copper slug on the armature end of its core, as indicated by the cross-hatched area at the upper end of the core, is slow to pull up and this delay is sufficient to permit registration of the sum to be refunded as explained above.

*Disconnecting bus from refund relays*

At spring 344, relay 311 opens the previously traced circuit for relays 42, restoring those relays to disconnect the refund relays from the computer bus.

At spring 345, relay 311 opens the previously traced circuit for relay 6, permitting that relay to restore.

At spring 346 and its make contact, relay 311 establishes a locking circuit for itself, which circuit extends to positive on conductor 287 thereby maintaining relay 311 operated so long as relay 301 remains operated.

At spring 346 and its break contact, relay 311 opens the previously traced circuit for relay 309, thereby permitting that relay to restore and by re-closing spring 339 against its break contact closes the previously traced circuit for relay 2, operating that relay to re-connect the total bus 3 to the bus 4.

Operation of relay 308, as explained above, closes a circuit from positive through spring 337 and its make contact, conductor 352, through the winding of relay 206 to negative, operating that relay which closes a circuit for relay 207 as before. Relay 207 closes a circuit for relay 208 to prepare the bridge actuating relays for a computing cycle as before.

*Registering the total in the register switch of the subtracting device*

The foregoing operation having been completed, the attendant restores push button 319 and closes key 318 to reconnect the bridge actuating relays to indication cycle timer 351. If the timer is at the moment in such position as to maintain positive on the conductor leading through the key, nothing happens until the timer opens the circuit from the conductor to positive. If positive is not present on this conductor, the previously traced circuit of relay 302 is opened and that relay restores.

At spring 323 and its break contact, relay 302 closes a circuit through spring 326 and its make contact, through the winding of relay 304 to negative. Relay 304 operates over this circuit closing spring 329 and its make contact, thereby to extend a circuit from positive through the winding of relay 44 to negative.

Figure 4:
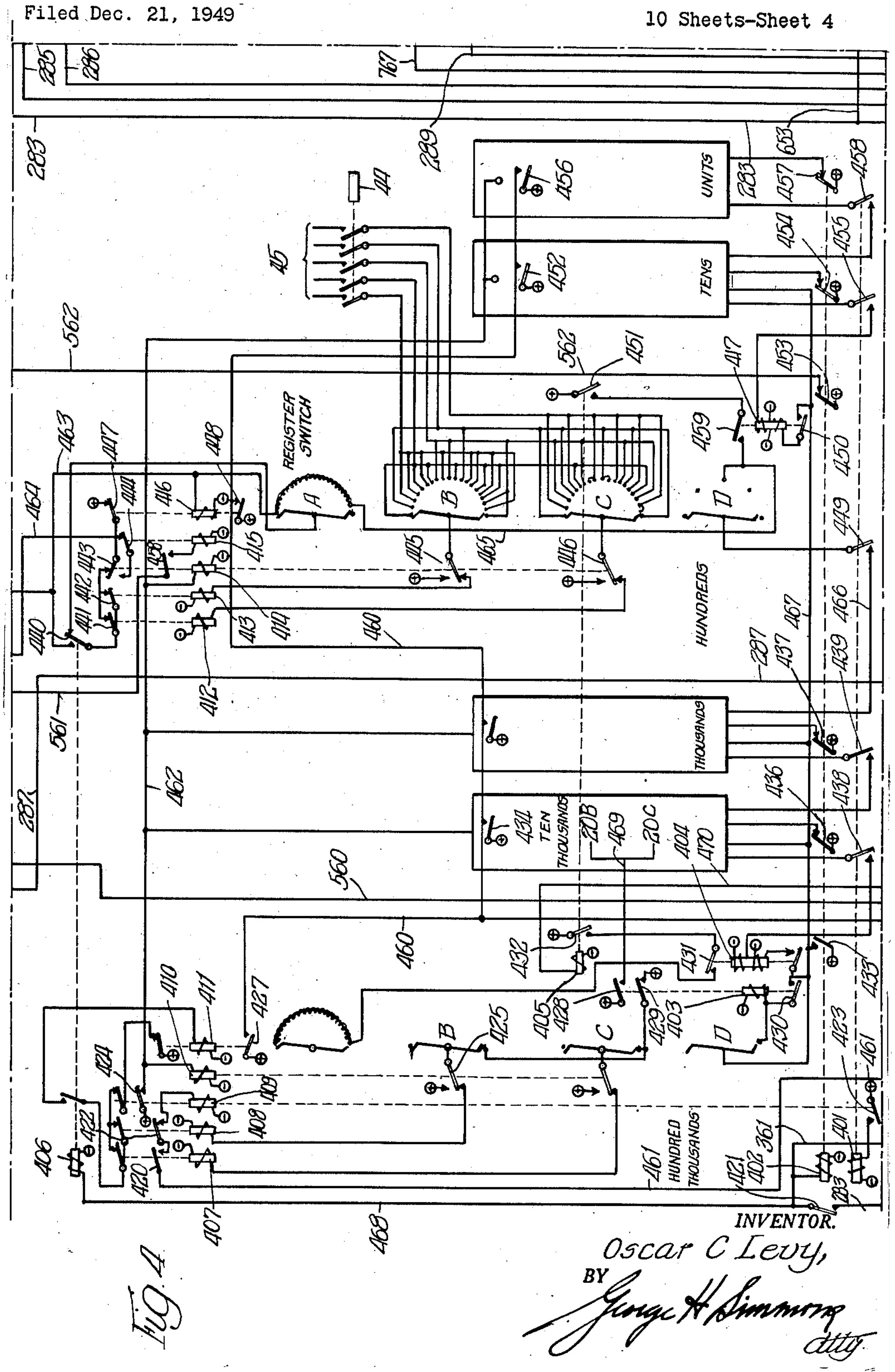
Fig. 4 is a schematic of the register switches.

As will be seen in Figs. 1, 4 and 5, relay 44 connects the extension 45 of the computer bus 20 to the banks of the register switch engaged by the B and C wipers of that switch.

Relays 2 and 17 now being both operated, relay 44 connects the total bus 3 to the bank contacts and positive on two of the five conductors in each digit section of the bus will thereby be placed upon those contacts.

The bus wires are connected into the banks of the register switch in a reverse order so that to reach a marked contact the switch takes a number of steps equal to the difference between the numerical value of the digit and ten. Thus, for example, if the digit is 7, the switch will step three steps from a starting position before encountering contacts to which potential is applied to indicate the digit 7. Following is a table showing the digit, the bus wires in the digit section to which positive is applied to indicate that digit, and the contacts engaged by wipers B and C to which those bus wires are connected:

| Digit | Bus Wires | Bus Conductor | Contacts Bank B | Bus Conductor | Contacts Bank C |
|---|---|---|---|---|---|
| 9 | 2 and 4 | 2 | 1 | 4 | 1 |
| 8 | 4 and 5 | 4 | 2 | 5 | 2 |
| 7 | 1 and 3 | 1 | 3 | 3 | 3 |
| 6 | 1 and 4 | 1 | 4 | 4 | 4 |
| 5 | 2 and 5 | 2 | 5 | 5 | 5 |
| 4 | 1 and 2 | 1 | 6 | 2 | 6 |
| 3 | 2 and 3 | 2 | 7 | 3 | 7 |
| 2 | 3 and 5 | 3 | 8 | 5 | 8 |
| 1 | 1 and 5 | 1 | 9 | 5 | 9 |
| 0 | 3 and 4 | 3 | 10 | 4 | 10 |

Repeated contacts 11 to 20, inclusive, banks B and C

*Setting register switches on total*

Restoration of relay 302 also closes a circuit from positive through spring 324 and its break contact, spring 328 and its make contact, relay 303 being slow to release, not yet having restored, conductor 361, through the winding of relay 402 to negative, with a parallel path extending over conductor 468, through the winding of relay 406 to negative. Relays 402 and 406 operate over this circuit, relay 402 closing springs 421 against its make contact, thereby locking the relays to positive placed on conductor 283 by wiper A of the access switch which now engages the second contact in its bank.

Relay 402 opens spring 453 from its break contact thereby removing positive from the bank of the refund switch (Fig. 5) engaged by wiper A of that switch, and opens springs 436, 437, 454 and 457 from their respective break contacts thereby to remove positive from the A banks of the other refund switches.

Relay 406, upon operating, closes a circuit for the motor magnet 416 of the register switch, which circuit may be traced from positive through spring 447 and its break contact, spring 443 and its break contact, over parallel paths through the break contacts of and springs 441 and 442, spring 440 and its make contact, conductor 463, through the winding of magnet 416 to negative.

Magnet 416 operates over this circuit, opening springs 447 to break the circuit, permitting the magnet to fall back and advance the wipers one step. As soon as the magnet falls back, its circuit as above traced is re-established and the magnet again operates, causing the switch to operate in a buzzerlike fashion to move its wiper step-by-step over the bank contacts.

Magnet 416 and the corresponding motor magnet of each of the other digit switches in the subtracting device apply positive to conductor 460, magnet 416, by closing spring 448 against its make contact. Slow-to-release relay 303, upon operating, closes spring 325 against its make contact, thereby extending its circuit from the positive on conductor 460 through the winding of relay 303 to negative, holding that relay in operated position so long as the motor magnets are intermittently operated as above.

Either of the wipers B and C of the register switches may encounter positive on any one of their respective bank contacts dependent upon the digit registered in the switch. Both of the wipers B and C will encounter positive only when engaging contacts corresponding to the digit registered in the switch. Assume for the moment that the digit is 7. From the foregoing code, it will be seen that both wipers will engage positive when engaging the third contact in their respective banks. Circuits will thus be simultaneously extended from that positive through wiper B, spring 445 and its break contact, through the winding of relay 413 to negative and through wiper C, spring 446 and its break contact, through the winding of relay 412 to negative, operating those relays. Springs 441 and 442 thus being opened from their respective break contacts at the same instant, the circuit of motor magnet 416 is broken and the register switch comes to rest on its third bank contacts, indicating that the hundreds digit of the total is the digit 7. Each of the other switches seeks out marked contacts indicative of the digit in the same manner.

*Stopping the hundred thousands digit register switch*

In Fig. 4, the hundred thousands digit register switch, operated by magnet 411, is partially shown. It will frequently happen that the sum in the total does not equal $100,000.00, in which case wipers B and C of this switch will fail to find positive potential simultaneously, and if provisions for stopping the switch were not made the switch would buzz on continuously, thereby maintaining relay 303 in its operated position and delay further operations. To guard against such contingency, relay 402, upon operating, closes spring 433 against its make contact, thereby applying positive to conductor 467 and to the wiper D of the hundred thousands register switch.

When wiper D engages the nineteenth contact in its bank, a circuit may be traced from that wiper and contact through the winding of relay 403 to negative, operating relay 403 which, by closing spring 430 against its make contact, locks itself to positive on conductor 467.

At spring 429 and its make contact, relay 403 applies positive to the twentieth bank contacts engaged by wipers B and C of the switch, so that upon taking one more step these wipers find positive simultaneously, relays 407 and 408 are operated, and the circuit of motor magnet 411 is open.

It may happen that the sum to be registered in the subtracting switch does not equal $10,000.00 and the ten thousands register switch likewise has to be stopped. Relay 403, by closing spring 428 against its make contact, extends positive over conductor 469 to the twentieth contacts in the banks of the ten thousands register switch engaged by wipers B and C of that switch.

Each of the digit register switches in the subtracting device having thus come to rest, positive is removed from conductor 460 and relay 303 restores.

*Subtracting the refund sum from the total sum*

Relay 303, upon restoring, closes a circuit from positive through spring 323 and its break contact, spring 326 and its break contact, and thence over parallel paths, one extending through spring 330 and its make contact, through winding of relay 306 to negative, operating relay 306. Relay 306 at spring 333 and its break contact opens the circuit of relay 17 which restores to disconnect the computer bus 20 from the bus 4. At spring 333 and its make contact, relay 306 locks itself to positive through spring 332 and its break contact. The second parallel path extends from spring 326 and its break contact, conductor 461, spring 420 and its make contact, spring 422 and its make contact, through the winding of relay 409 to negative, operating relay 409.

Relay 409 closes a circuit from positive through spring 424 and its make contact, conductor 462, from which branches extend into each of the digit switches; in the hundreds digit, the circuit extending through the winding of relay 414 to negative, operating that relay.

A circuit may now be traced from positive through spring 447 and its break contact, spring 443 and its make contact, spring 444 and its break contact, conductor 464, through the winding of relay 501 to negative, operating relay 501.

Relay 501 closes a circuit from positive through spring 552 and its make contact, through the winding of motor magnet 502 to negative, operating that magnet preparatory to advancing the wipers of the refund switch.

Magnet 502, upon operating, closes a circuit from positive through spring 551, conductor 560, spring 334 and its make contact, through the winding of relay 307 to negative, to maintain that relay operated so long as magnet 502 operates. Conductor 560 is multipled into similar contacts operated by the motor magnets of the other digit switches, and relay 307 will be locked in operated position so long as any one of the switches is operating, the relay being slow to release does not restore between successive energizations of the magnets.

Relay 501 also closes a circuit from positive through spring 550 and its make contact, conductor 463, through the winding of magnet 416 to negative, operating that magnet preparatory to advancing the wipers of the register switch.

At springs 447, magnet 416 opens the circuit of relay 501, causing that relay to restore and open the above circuits of magnets 416 and 502, whereupon the two switches take one step each. Restoration of magnet 416 again closes the circuit for relay 501 and the foregoing operation is repeated, stepping the switches step-by-step until the B wiper of the refund switch encounters the contact upon which positive has been placed to indicate the hundreds digit of the sum to be refunded.

A circuit may now be traced from that positive through wiper B, conductor 561, spring 458 and its make contact, through the winding of relay 415 to negative, operating relay 415 which opens spring 444 from its break contact, thereby opening the circuit of relay 501 to prevent that relay from operating to step the switches another step.

Assume for the moment that the hundreds digit of the total sum is 7, and that the hundreds digit of the subtrahend is 5. The switches therefor would take five steps before being stopped; and since the register switch was resting on its third bank contact when such stepping began, the switch will come to rest on its eighth bank contact. From the above table, it will be seen that the eighth contact corresponds to the digit 2, which is the difference between 7 and 5.

Simultaneously with the foregoing stepping of the hundreds digit switches, the switches of the other digits are stepped so that the register switches are in positions corresponding to the difference which is the corrected total.

Assume for the moment that the register switch wipers were positioned on their respective seventh bank contact, indicating that the hundreds digit of the total was 3 and that the hundreds digit of the subtrahend was 5. It is therefore necessary for the hundreds digit to borrow one from the thousands digit in arriving at the correct difference.

*Borrow circuits*

Starting from the seventh bank contact, the wipers of the register switch will engage their tenth bank contact at the end of the third one of the five steps to be taken. Energization of relay 409, as above, closes the circuit from positive through spring 423 and its make contact, through the winding of relay 401 to negative, operating that relay, which closes springs 449 connected to the D wiper of the hundreds register switch and closes springs 438, 439, 455 and 458 connected to the D wipers of the other digit switches.

When magnet 416 is again energized preparatory to advancing the switch wipers from their tenth to their eleventh bank contacts, a circuit may be traced from positive on conductor 463 through the first nineteen contacts of the bank engaged by wiper A of the register switch, which contacts are multipled together, conductor 465, the tenth bank contact engaged by wiper D and that wiper, spring 449 and its make contact, conductor 466, to a relay in the thousands digit corresponding to relay 417 in the hundreds digit, to negative, operating that relay.

Assume, also, that the tens digit is borrowing from the hundreds digit so that relay 417 will be operated, the relay locking from positive on conductor 467, through spring 450 and its make contact, and the lower winding of the relay to negative.

The remaining two steps of the five to be taken in the example assumed above having been completed and the switches brought to rest, when relay 307 falls back as it will when motor magnet 502 maintains springs 551 open, thereby removing positive from conductor 560, a circuit may be traced from positive through spring 335 and its break contact, spring 336 and its make contact, conductor 470, through the winding of relay 405 to negative.

Relay 405 operates and in the hundreds digit register closes spring 451 against its make contact thereby extending a circuit from positive through spring 459 and its make contact, conductor 465, the multipled together bank contacts engaged by wiper A of the register switch, through the winding of magnet 416 to negative.

In each of the other digit switches in which a borrow has been made, similar circuits are closed.

Restoration of relay 307 opens the circuit of relay 308 which, after a brief interval, falls back, opening the above traced circuit for relay 405, thereby opening springs 451 permitting magnet 416 to restore and advance the switch wipers one step, thereby reducing the numerical value of the digit by one.

*Placing the corrected total in the total arm of the bridge*

Restoration of relay 308 opens the previously traced circuit for relay 206 by moving spring 337 away from its make contact, permitting that relay to restore and at spring 242 and its break contact close a circuit from positive through spring 244 and its make contact, conductor 281, spring 322 and its make contact, through the winding of relay 305 to negative, operating relay 305. Spring 332 moves away from its break contact, thereby opening the previously traced locking circuit for relay 306 which restores to prepare a point in the circuit of relay 17. Spring 332 moving into engagement with its make contact closes a circuit from positive through key spring 317 and its make contact, through the winding of relay 19 to negative, operating that relay to connect bus 20 to the total arm of the bridge.

Relay 305, by closing spring 331 against its make contact, re-closes the previously traced circuit of relay 44, thereby connecting the banks of the register switch engaged by wipers B and C to bus 20, and through relay 19 to the relays controlling the setting of the resistance of the total arm of the bridge.

Positive placed on wiper B of the register switch, through spring 445 and its make contact, and on wiper C through spring 446 and its make contact, will close circuits to operate two of the relays in the group 601 to 605, inclusive, thereby to set the hundreds digit section of the bridge arm to a value corresponding to the hundreds digit in the corrected total.

Relay 206, upon restoring, opens the circuit of relay 207 which, after a brief interval, restores and at spring 243 and its break contact closes a circuit through spring 245 and its make contact, through the winding of relay 209 to negative, operating that relay which, through spring 248 and its make contact, locks to positive picked up by the A wiper of the access switch which, as hereinbefore explained, is now resting on its second bank contact.

Circuits hereinbefore traced are completed through the C and D wipers of the access switch, thereby to connect the bus on runner Number 2 to bus 4, relay 17 is re-operated when relay 306 restores, and a resistance corresponding to the sum then registered on runner Number 2 is place in the runner arm of the bridge. The operation through the remainder of the cycle is the same as hereinbefore explained.

*Restoring the subtracting device*

When the access switch moves from its twelfth contact, wiper A moves out of engagement with positive potential thereby removing positive from conductor 283, restoring relays 402 and 406 which were locked to this conductor through spring 421 and its make contact. Spring 453 moves into engagement with its break contact, thereby applying positive to the first nineteen contacts of the bank engaged by wiper A of the refund switch, completing a circuit through that wiper through spring 553 and its break contact, through the winding of motor magnet 502 to negative, operating that motor magnet which interrupts its own circuit by opening springs 553 to advance the wiper one step. The switch operates in a buzzerlike fashion until wiper A engages the twentieth bank contact which does not contain positive potential and the switch comes to rest in its normal position. Restoration of relay 406 closes spring 449 against its break contact, thereby completing a circuit from positive through spring 447 and its break contact, spring 443 and its break contact, springs 441 and 442 and their respective break contacts in multiple, spring 440 and its break contact, wiper A and the contact on which the wiper is resting, through the winding of magnet 416 to negative, operating magnet 416 which interrupts the above circuit by opening springs 447 causing the switch to operate in a buzzerlike fashion until wiper A moves to its twentieth bank contact, at which time the circuit is opened and the switch comes to rest.

Restoration of relay 402 opens springs 433, removing positive from conductor 467, thereby opening the circuit through the lower winding of relay 417, permitting that relay to restore, thereby restoring the subtracting device to normal.

*Late scratch of two or more runners*

It occasionally happens that more than one runner will be scratched at the last minute. In the foregoing description of the late scratch operation with but one runner scratched, the sum registered on that runner was set up in the refund relays. Obviously if two runners are scratched simultaneously, different provisions must be made to register the sum to be refunded in the refund relays, since that sum is the sum of the totals then registered on the two runners.

It will be noted that in Fig. 5 the hundreds digit section of the refund relays is equipped with a manually operated decade switch, the wiper 508 of which can be moved manually to a contact corresponding to the value of the hundreds digit of the sum to be refunded. Each of the other digit sections of the refund relays is similarly equipped and the attendant will ascertain the sum to be refunded and manually set the decade switches accordingly. With the sum thus registered, the operation of subtracting the amount to be refunded from the total on each cycle of the computer is carried out as hereinbefore explained.

It will also be noted in Fig. 6 and in Fig. 7 that the total and runner arms of the bridge are each equipped with decade switches to permit manually setting the resistance value of that arm. This provision is made primarily for the purpose of testing and permits the attendant to set the value of these arms at will for that purpose.

Throughout the foregoing description, the code of five conductors per digit, five relays per digit with two relays operated simultaneously to complete a digit, has been used. The computer of the present invention can be used with other codes; for example, the code in which there are six conductors and relays per digit, three of which relays must be operated simultaneously to register the digit. Modification of the circuit shown by way of example to include such code is contemplated within the teachings of the invention.

*Recycling the computer*

There are instances where the totalisator may initiate a new indication cycle before the computer has completed its cycle and it is necessary to provide for recycling the computer under these conditions. Thus, for example, if in a race the start is effected a few seconds after a normal indication cycle, the racing start steward may operate his switch to stop the further sale of tickets before the computer has run out its cycle. Immediately the racing steward operates his key, the totalisator recycles to register the final total in the pool and also the final total on each runner. Such recycling reapplies positive to the conductor leading to the bridge actuating relays and recycling of the computer will be effected.

If the computer is operating under normal conditions, that is, there are no late scratches, relay 301 will be in its normal position. If in the process of a cycle, relay 209 will be operated as explained above to extend the control circuits from the C and D wipers of the access switch. Positive placed on the conductor leading to the actuating relays under these circumstances will reoperate relay 206, which, by closing spring 241 against its make contact, will extend a circuit from positive through spring 249 and its make contact, through the winding of relay 210 to negative. Relay 210 operates over this circuit and by closing spring 253 against its make contact extends a circuit from positive through the first twelve multipled together contacts of the bank of the access switch engaged by wiper A, through that wiper, spring 253 and its make contact, spring 259 and its break contact, through the winding of motor magnet 212 of the access switch to negative. The motor magnet operates over this circuit and by opening spring 259 from its break contact interrupts the circuit and falls back to advance the wipers one step; whereupon the circuit is again closed and the switch re-operates in buzzerlike fashion until wiper A moves to the thirteenth bank contact. A circuit is now closed from positive on multipled together contacts 13 to 19 inclusive, engaged by the B wiper of the access switch, through spring 259 and its make contact, through the winding of motor magnet 212 to negative, and the buzzerlike operation of the switch is continued over this circuit until wiper B engages its twentieth bank contact and the switch is thus brought to rest in its normal position.

Operation of relay 210 at spring 255 and its make contact closes a circuit from positive through the upper winding of relay 203 to negative, operating that relay to reset the balancing chain in the hereinbefore explained manner.

Disengagement of wiper A from positive removes that potential from conductor 283, thereby to restore relays locked up to that conductor.

Energization of relay 206 initiates a new cycle of operation of the computer so that the odds placed upon the indicators represent the final odds corresponding to the final sums indicated.

If the computer is operating under late scratch conditions, relay 301 will be in its operated condition and the positive received from the totalisator will close a circuit through spring 321 and its make contact and through the winding of relay 302 to negative.

Relay 302 operates and at spring 324 and its make contact extends a circuit from positive over conductor 362 through spring 249 and its make contact, through the winding of relay 210 to negative, operating that relay to reset the access switch as before.

In due course of the late scratch cycle of operations, relay 308 is operated and at spring 337 and its make contact closes a circuit for relay 206, thereby to operate that relay to initiate a new cycle of operation of the computer under late scratch conditions.

From the foregoing it will be apparent that the computer of the present invention possesses many advantages over the manual setting of a line of odds as heretofore practiced. With a maximum of twelve runners, the computer operates automatically each time the totalisator cycles, and computes the odds on each runner and adjusts appropriate indicators to indicate those odds. The entire line of odds can be set in approximately five seconds. In cases where late scratches have occurred and correcting the total is necessary on each cycle, a slightly longer time is required; however, under these conditions less than twelve runners are involved, and in certain instances the required line of odds can be set in approximately six seconds.

While I have chosen to illustrate my invention by illustrating and described a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

1. In a computer, a Wheatstone bridge; means including relays for setting a first arm of said bridge to an ohmic value corresponding to a total sum; means including relays for setting a second arm of said bridge, adjacent the first arm, to an ohmic value corresponding to a second sum; means including manual switches for setting a third arm of said bridge, adjacent the second and opposite the first arm, to an ohmic value bearing the same percentage relation to a fixed resistance value as the percentage of said total sum to be considered bears to the total sum; a fourth arm for said bridge adjacent the first and third arms and opposite the second arm, comprising a plurality of fixed resistors connected together in series and having a total value equal to the product of the fixed resistance in said third arm and the largest ratio to be handled by the bridge; means for energizing the bridge; a chain of relays operating sequentially to by-pass the first resistors in said fourth arm, one at a time; means for stopping said chain relays when said bridge is in balance; and means controlled through the chain relay energized when said chain is stopped for indicating the ratio the part of the first sum that is to be considered bears to said second arm.

2. A computer bridge as claimed in claim 1, in which the resistance in the fourth arm has a maximum value one hundred times the maximum value of the resistance in the third arm so that the bridge can handle ratios up to one hundred to one.

3. In a computer, a Wheatstone bridge; means including relays for setting a first arm of said bridge to an ohmic value corresponding to a total sum; means including relays for setting a second arm of said bridge, adjacent the first arm, to an ohmic value corresponding to a second sum; means including manual switches for setting a third arm of said bridge, adjacent the second and opposite the first arm, to an ohmic value bearing the same percentage relation to a fixed resistance value as the percentage of said total sum to be considered bears to the total sum; a fourth arm for said bridge, adjacent the first and third arms and opposite the second arm, comprising two sets of fixed resistors, each of which contains a plurality of resistors connected in series, which sets are connected together in series and have a total ohmic value equal to the product of the fixed resistance in said third arm and the highest ratio to be handled by the bridge; means for energizing the bridge; a chain of relays associated with said fourth bridge arm; contacts on each chain relay for by-passing a resistor in the first one of said sets of resistors when the relay is energized; contacts on each chain relay for by-passing a resistor in the second of said sets of resistors; a range relay operated to shift the bridge circuit from the first to the second set of contacts thereby to permit bringing the bridge into balance at a number of points twice as great as the number of relays in the chain; and means controlled through said chain relays when the bridge is in balance for indicating the ratio that part of the total sum to be considered bears to said second sum.

4. The combination with an odds computer having a bridge into one arm of which a resistance indicative of a total sum is placed by relays actuated by potentials indicative of a code on a total bus, and into another arm of which resistances indicative of individual runner sums are placed on at a time by relays actuated by potentials indicative of a code on individual runner busses and the bridge balanced to determine the approximate odds on the individual runners; of a late scratch control comprising: a group of refund storage relays; key means for scratching the runner and for connecting the refund storage relays to the individual runner bus corresponding to the scratched runner to operate certain ones of the relays and thereby store the sum then registered on that runner in said relays; late scratch control relays; a subtracting device; means in said late scratch control relays for connecting a register switch for each order in said subtracting device to said total bus and for stepping said switches to positions indicative of the sum registered on the total bus; means for operating said subtracting device to subtract from said total sum the sum registered in said refund storage relays; and means for placing a resistance indicative of the difference between said sums into the total arm of the bridge as a total against which resistances indicative of the individual runner sums are balanced to determine the approximate odds on the runners.

5. In a ratio computing device, a bridge comprising: a total arm comprising a plurality of resistors connected in series; means including a group of relays a plurality of which are operated simultaneously to by-pass a portion of said resistors and thereby adjust the resistance of said bridge arm to a desired value; a second arm comprising a plurality of resistors connected in series, a connection between one end of said bridge arm and one end of said second arm; means including a group of relays a plurality of which are operated simultaneously to by-pass a portion of said resistors and thereby adjust the resistance of said second arm to a desired value; a correcting arm comprising a plurality of resistors, a connection between one end of said correcting arm and the other end of said second arm; manual contactors for connecting a portion of said correcting arm resistors together in series thereby to adjust the correcting arm to a desired value; a balancing arm comprising a plurality of resistors connected together in series, a connection between one end of said balancing arm and the other end of said correcting arm, a connection between the other end of the balancing arm and the other end of said total arm; means including a battery connected between the junction of the total and balancing arms and the junction between the correcting and second arms for energizing the bridge; means including a chain of relays adapted to operate automatically and in sequence for by-passing the resistors in the balancing arm, one at a time, and thereby bring the bridge into balance; a control unit connected between the junction of the total and second arms and the junction between the balancing and correcting arms of the bridge; means including a relay in said control unit for stopping said chain of relays when the bridge is in balance; an indicator; and means including a relay operated by said control unit relay through said chain relays for operating said indicator to indicate the ratio that the resistance value in said total arm bears to the resistance value in said second arm.

6. A computing device as claimed in claim 5, in which the resistors in the total and second bridge arms are each divided into subgroups and in which there are a plurality of control relays for each subgroup and in which a plurality of the relays in each of the subgroups are energized simultaneously to adjust the ohmic value of the arm.

7. A computing device as claimed in claim 5, in which the total and second bridge arms each contain a group of resistors having one ohm each, a group having ten ohms each, a group having one hundred ohms each, a group having one thousand ohms each, a group having ten thousand ohms each, and a group having one hundred thousand ohms each, and in which there is a group of control relays for each group of resistors and in which a plurality of said relays are operated simultaneously to adjust the ohmic value of the arm.

8. A computing device as claimed in claim 5, in which the resistors in the total and second bridge arms are each divided into subgroups and in which there are five control relays per subgroup and in which two of the relays in each subgroup are energized simultaneously to adjust the ohmic value of the arm.

9. A computing device as claimed in claim 5, in which the balancing arm has a group of resistors for high range and a group of resistors for low range, and in which the control unit upon completion of the bridge makes a preliminary test to determine the range in which the chain relays are to by-pass the resistors one at a time to balance the bridge.

10. A computing device as claimed in claim 5, in which the balancing arm has a group of resistors for high range and a group of resistors for low range, and a switching relay operated through the first relay in the chain under the control of the control unit to determine the range in which the remaining relays in the chain are to by-pass the resistors one at a time to balance the bridge.

11. In a computer, a subtracting device comprising: a pair of stepping switches for each order of a sum, each switch having banks of contacts engaged by wipers over which contacts the wipers sweep step-by-step as the switch steps; means including relays for placing potentials on certain contacts in the banks of the first ones of said pairs of switches in accordance with a code to register a total in the banks of contacts; means for stepping said first switches until their wipers engage said certain contacts thereby to set the switches to correspond to the total registered in the banks of contacts; means including relays for placing potentials on certain ones of the contacts in the banks of contacts of the second switch of each pair of switches to register a subtrahend in those banks of contacts; means controlled by the first switch of each of said pairs of switches for stepping that pair of switches in unison step-by-step; a relay energized over a circuit closed through a wiper of the second switch of each pair when that wiper engages the contact upon which said potential has been placed for stopping that pair of switches; and means including the wipers of the first switch of each pair of switches and the contacts then engaged thereby for transmitting from said subtracting device potentials in accordance with a code indicating the difference between said total and subtrahend.

12. In a computer in which numbers are registered by simultaneously operating a plurality of relays per order over circuits completed over a multi-conductor per order bus in accordance with a particular code; a stepping switch for each order; a plurality of wipers on each switch corresponding in number to the number of relays simultaneously operated to register a digit in the order; a bank of contacts for each switch including a row of contacts for each wiper; relay means for connecting the bus to said banks thereby to apply potential to certain contacts therein in accordance with said code; a test relay for each wiper; circuits for said test relays completed when the associated wiper engages a contact containing said potential to operate the relay; a motor magnet for each switch; a circuit for each motor magnet over which impulses are delivered to the magnet to operate it thereby to step the wipers over said banks; and normally closed contact means for each test relay included in the circuit of the associated motor magnet to open that circuit when the test relays associated with a switch are operated simultaneously thereby to stop the switch with the wipers engaging contacts corresponding to the digit registered in the switch.

13. In a computer in which numbers are registered by simultaneously operating a plurality of relays per order over circuits completed over a multi-conductor per order bus in accordance with a particular code; a stepping switch; a plurality of wipers on said switch corresponding in number to the number of relays simultaneously operated to register a digit in the switch; a bank of contacts containing a row of contacts for each wiper of said plurality of wipers; means including a relay for connecting the bus to said bank thereby to apply potential to certain contacts therein in accordance with said code; a test relay for each wiper; a motor magnet for said switch; a circuit for said motor magnet over which impulses are delivered to the magnet to operate it thereby to step the wipers over said bank; and means including normally closed contacts on said test relays and included in said motor magnet circuit to open that circuit when said test relays are operated simultaneously thereby to stop the switch with the wipers engaging contacts corresponding to the digit registered in the switch.

14. In a computer in which numbers are registered by simultaneously operating two of five relays per order over a five wire per order bus in accordance with a particular code; a stepping switch; a pair of wipers in said switch; a bank of contacts for each wiper; means including a relay for extending the bus to said banks of contacts to place a potential on contacts in each bank in accordance with said code thereby to register a digit in the switch; a motor magnet for said switch; a circuit for said magnet over which impulses are delivered to the magnet to operate the switch to move the wipers step-by-step over their banks; a pair of test relays; a circuit for each relay completed through an associated one of said wipers when that wiper encounters said potential for operating the relay; and a pair of normally closed contacts on each relay connected in the circuit of said motor magnet each in parallel with a corresponding contact on the other relay, which contacts are opened when the relays are operated simultaneously to stop the switch on contacts corresponding to the digit registered therein.

15. In a computer, a subtracting device comprising: a pair of stepping switches per order; a bank of contacts for each switch; a plurality of rows of contacts in each bank; a wiper engaging each row of contacts; means including relays for applying potential to contacts in a plurality of rows in the banks of the first of said switches in each order in accordance with a code to register the digits of a total in said banks in reverse sequence so that the wipers on moving from starting contacts to the marked contacts take a number of steps equal to the difference between the value of each digit and ten; a motor magnet for each switch; a circuit for each magnet over which the magnet is operated to move the wipers step-by-step over its bank; relay means in the circuit of the first switch of the pair for each order operable when the wipers of said switch engage said marked contacts for opening the circuit of the motor magnet to stop the switch with the wipers in a position indicative of the value of the digit registered in the switch; means including a plurality of relays operated in accordance with a code for placing a potential on a contact in the bank of the second one of the pair of switches for each order to register the digits of a subtrahend in said banks in numerical order so that the wipers on moving from a starting contact to the marked contact take a number of steps equal to the numerical value of the digit; a stepping relay; a circuit for said stepping relay closed through normally closed contacts controlled by the motor magnet of said first switch; circuits for the motor magnets of said first and second switches closed through normally open contacts on said stepping relay to operate said magnets to step the switches in unison; a control relay; a circuit for said control relay closed through the wiper of said second switch when the wiper engages said marked contact to operate the control relay; normally closed contacts on said control relay included in the circuit of said stepping relay for opening the circuit of the stepping relay when the control relay operates thereby to stop said switches with the wipers of said first switch in a position corresponding to the difference between said total and subtrahend.

16. The combination with a totalisator in which total sums are registered on indicators by simultaneously operating a plurality of relays per order over circuits completed over a multi-conductor per order bus in accordance with a particular code and in which each of a plurality of individual runner sums are similarly registered over similar busses individual to the runner; of an odds computer comprising: a bridge; a group of actuating relays associated with said bridge; a first group of code relays for a first arm of said bridge; a second group of code relays for a second arm of said bridge; an access switch operable step-by-step under the control of said actuating relays; switching relay means operated through said actuating relays to connect said total bus to said first code relays to operate the relays and thereby adjust the resistance of said first bridge arm to a value indicative of the total sum then registered in the totalisator; a locking circuit for said operated code relays closed through said access switch; means in said actuating relays for operating said switching relays to disconnect said total bus from said first code relays; a switching relay for each individual runner; means in said actuating relays for closing a circuit through said access switch to the switching relay for the first runner to connect the individual runner bus for that runner to the second group of code relays to operate the relays and thereby adjust the resistance of said second arm to a value indicative of the sum registered on the first runner; a third arm for said bridge adjacent to said second arm and opposite said first arm; a fourth arm for said bridge adjacent to said first and opposite said second arm; means for energizing said bridge; means including relays operable to vary the resistance of said fourth bridge arm for bringing the bridge into balance; a relay operable when the bridge is in balance; and means controlled by said latter relay for operating said access switch thereby to disconnect said first runner bus from and to connect the second runner bus to said second code relays.

17. The combination with a totalisator in which total sums are registered on indicators by simultaneously operating a plurality of relays per order over circuits completed over a multi-conductor per order bus in accordance with a particular code and in which each of a plurality of individual runner sums are similarly registered over similar busses individual to the runner; of an odds computer comprising: a bridge;

a group of actuating relays associated with said bridge; a first group of code relays for a first arm of said bridge; a second group of code relays for a second arm of said bridge; an access switch operable step-by-step under the control of said actuating relays; a bus in said computer: switching relay means operated through said actuating relays to connect said total bus to said computer bus and the computer bus to said first code relays to operate the relays and thereby adjust the resistance of said first bridge to a value indicative of the total sum then registered in the totalisator; a locking circuit for said operated code relays closed through said access switch; means in said actuating relays for operating said switching relay means to disconnect said total bus from said computer bus and to disconnect said computer bus from said first code relays and connect it to said second code relays; a switching relay for each individual runner; means in said actuating relays for closing a circuit through said access switch to the switching relay for the first runner thereby to connect the first runner bus through the computer bus to said second code relays to operate those relays to adjust the resistance of said second arm to a value indicative of the sum registered on the first runner; a third arm for said bridge adjacent to said second arm and opposite said first arm; a fourth arm for said bridge adjacent said first and opposite said second arm; means for energizing said bridge; means including relays operable to vary the resistance of said fourth bridge arm for bringing the bridge into balance; a relay operable when the bridge is in balance; and means controlled by said latter relay for operating said access switch thereby to disconnect said first runner bus from and to connect the second runner bus to said second code relays.

18. A computer as claimed in claim 17, characterized in that the relay operated when the bridge is in balance controls the access switch to connect the individual runner busses to the second code relays one at a time and in sequence, thereby to enable the computer to determine the ratios between the total sum and the individual runner sums.

19. In a computer, a stepping switch; a plurality of rows of contacts in said switch; a wiper for each row of contacts; a motor magnet; a circuit over which said motor magnet is operated intermittently to step said wipers over said contacts; a multi-conductor bus; means including a relay for extending said bus to said contact rows so that potentials on a plurality of said bus conductors, in accordance with a code, will mark a corresponding position in the switch; means for closing said motor magnet circuit to operate said switch in search of said marked position; a relay for each wiper; contacts on said relays included in said motor magnet circuit operated when the wipers are in said marked position to stop the switch in that position; a slow to release relay maintained operated while said motor magnet is operating to move said wipers and restored when said switch is stopped in said marked position; a second circuit for said motor magnet; means controlled by said slow to release relay in restored position for closing said second circuit a plurality of times to operate the switch a predetermined number of steps from said marked position; a group of code relays; means including relays for extending said bus conductors to said code relays; and means for closing circuits through said wipers and the contacts then engaged thereby and said bus conductors to operate said code relays in accordance with the final position of said switch.

20. A computer subtracting device comprising: a stepping switch; a pair of wipers on said switch; a row of contacts for each wiper; a motor magnet for said switch; a circuit for said switch intermittently closed to operate the magnet to step the wipers over said rows of contacts; a five wire bus; connections between said bus and contacts for placing a potential on the contacts in accordance with a code to register the digits between nine and zero in sequence reverse to the stepping of the wipers; a pair of test relays; circuits for said test relays completed through said wipers and potential carrying contacts; contacts on said test relays included in the motor magnet circuit for opening the circuit when the test relays are energized simultaneously to stop the switch with the wipers in a position corresponding to the digit marked on said contacts; means comprising a second intermittently closed circuit for said switch and relays for controlling that circuit for stepping said wipers from said marked position a number of steps corresponding to a digit of a subtrahend; and means for applying a potential to said wipers and therethrough to the contacts they engage to transmit from the switch to said bus a code indicative of the difference between said first marked digit and said subtrahend.

21. A computer subtracting device as claimed in claim 20, in which there is a stepping switch for each order of a sum and in which there are borrow circuits between switches over which the next higher order switch is operated an additional step whenever the subtrahend digit of the next lower order is greater than the first marked digit of that order.

22. A computer subtracting device as claimed in claim 20, in which the means for stepping the switch wipers from the first marked position comprises a second stepping switch in the banks of contacts of which the subtrahend digit is marked by a potential placed on a contact in the bank corresponding to the value of the digit and in which a control relay circuit is closed through the switch circuit and potential carrying contact to operate the relay and in which a contact on the control relay is thereby opened to stop both switches.

23. An odds computer for use in connection with a totalisator in which sums registered in a total pool and sums registered on each runner in that pool are indicated under the control of multi-relay indicators in which a plurality of relays are energized simultaneously to effect indication of each order of said sums; an indication bus comprising a group of conductors for each order of each of said sums corresponding in number to the number of relays per order in said indicators; a computer bus comprising a group of conductors for each order corresponding in number to the conductors in the indication bus; means including a relay for connecting said computer bus to the total portion of said indication bus; a total bridge arm comprising a plurality of resistors for each order of said total sum and a plurality of relays per order; means including a relay for connecting said computer bus to said total arm relays thereby to close circuits to operate the total arm relays necessary to set the resistance of the total arm to an ohmic value corresponding to the sum then indicated in the total pool; a runner arm in said bridge comprising a plurality of resistors for each order and a plurality of relays per order; means including a stepping switch for disconnecting said computer bus from said total portion of said indication bus and from said total bridge arm; means including relays operated through said stepping switch for selectively connecting said computer bus to the individual runner portions of said indication busses one at a time and for connecting the computer bus to said individual runner bridge arm relays thereby to close circuits to operate the runner bridge arm relays necessary to set that arm of the bridge to an ohmic value corresponding to the sum then registered on the selected runner; a correcting arm for said bridge comprising a plurality of resistors and manual levers for setting the ohmic value of the arm to correspond to the portion of the pool available for distribution; a balancing arm for said bridge comprising a plurality of resistors and a chain of relays through the contacts of which the ohmic value of the arm is varied in definite steps; a plurality of odds setup relays; a plurality of odds indicators, one for each runner in said pool; means including a relay operated through said stepping switch for connecting to said odds setup relays the indicator corresponding to the runner then connected to said runner arm of the bridge; a bridge control; means controlled by said bridge control when said bridge is balanced and operating through said balancing arm relays for energizing one of said odds setup relays; and means controlled by said energized odds setup relay for operating said associated odds indicator to indicate the approximate odds on the runner.

24. An odds computer for use in connection with a totalisator in which sums registered in a total pool and sums registered on each runner in that pool are indicated under the control of multi-relay indicators in which two of five relays are energized simultaneously to effect indication of each order of said sums; an indication bus comprising five conductors for each order of each of said sums; a computer bus comprising five conductors for each digit; means including a relay for connecting said computer bus to the total portion of said indication bus; a total bridge arm comprising a plurality of resistors for each digit of said total sum and five relays per order for connecting said resistors in the arm; means including a relay for connecting said computer bus to said total arm relays thereby to close circuits to operate two of said relays per order to set the resistance of the total arm to an ohmic value corresponding to the sum then indicated in the total pool; a runner arm in said bridge comprising a plurality of resistors for each order and five relays per order for connecting said resistors in the arm; means including a stepping switch for disconnecting said computer bus from said total portion of said indication bus and from said total bridge arm; means including relays operated through said stepping switch for selectively connecting said computer bus to the individual runner portions of said indication busses one at a time and for connecting the computer bus to said individual runner bridge arm relays thereby to close circuits to operate two of said runner bridge arm relays per order to set that arm of the bridge to an ohmic value corresponding to the sum then registered on the selected runner; a correcting arm for said bridge comprising a plurality of resistors and manual levers for setting the ohmic value of the arm to correspond to the portion of the pool available for distribution; a balancing arm for said bridge comprising a plurality of resistors and a chain of relays through the contacts of which the ohmic value of the arm is varied in definite steps; a plurality of odds setup relays; a plurality of odds indicators, one for each runner in said pool; means including a relay operated through said stepping switch for connecting to said odds setup relays the indicator corresponding to the runner then connected to said runner arm of the bridge, a bridge control; means controlled by said bridge control when said bridge is balanced and operating through said balancing arm relays for energizing one of said odds setup relays; and means controlled by said energized odds setup relay for operating said associated odds indicator to indicate the approximate odds on the runner.

25. In a computer, a stepping switch; a plurality of rows of contacts in said switch; a wiper for each row of contacts; a motor magnet; a circuit over which said motor magnet is operated intermittently to step said wipers over said contacts; a multi-conductor bus; means including a relay for extending said bus to said contact rows so that potentials on a plurality of said bus conductors, in accordance with a code, will mark a corresponding position in the switch; means for closing said motor magnet circuit to operate said switch in search of said marked position; a relay for each wiper; contacts on said relays included in said motor magnet circuit operated when the wipers are in said marked position to stop the switch in that position; a second stepping switch; a motor magnet in said second switch; a stepping relay associated with said second stepping switch; a slow to release relay associated with said switches and restored when said first switch is stopped on said marked contacts; a circuit for said stepping relay closed by said slow to release relay in restored position to operate that relay; circuits for said motor magnets closed by said stepping relay to step said switches in unison; a wiper in said second switch; a row of contacts engaged by said wiper; means for applying potential to a particular contact in said row to mark that contact; means including a relay operated over a circuit completed through said second switch wiper and said marked contact for opening the circuit of said stepping relay thereby to stop said switches; a group of code relays; means including relays for extending said bus conductors to said code relays; and means for closing circuits through said conductors to operate said code relays in accordance with the final position of said first switch.

26. In a subtracting device having a stepping switch for each order of a sum, which switches have banks of contacts in which digits appear in sequence reverse to the stepping of the switch, and which have a wiper for each row of contacts, and a motor magnet for moving the wipers over said contacts to set the switch on particular contacts to register therein the digits of a sum, and in which the motor magnets are then operated a plurality of times according to the value of a digit in the corresponding order of a subtrahend to reset the wipers on contacts indicative of the value of the corresponding digit of the difference between said sum and said subtrahend; a borrow wiper on each of said switches; a borrow relay associated with each switch; a circuit for each borrow relay extended through the borrow wiper of the next lower order switch and the tenth bank contact of that switch; means for energizing said circuit in parallel with the motor magnet of said next lower order digit switch when that magnet is energized to move said borrow wiper off of said tenth contact to operate said borrow relay; a circuit for the motor magnet of the switch with which the operated borrow relay is associated extended through contacts closed by said borrow relay in operated position; and means for closing said circuit when said switch wipers have been reset to operate said associated switch an additional step to lower the value of the corresponding digit in accordance with said borrow.

OSCAR C. LEVY.

References Cited in the file of this patent

UNITED STATES PATENTS

| Number | Name | Date |
|---|---|---|
| 2,087,039 | McMaster | July 13, 1937 |
| 2,108,146 | Simpson | Feb. 15, 1938 |
| 2,123,142 | McMaster | July 5, 1938 |
| 2,271,598 | Gordon | Jan. 27, 1942 |
| 2,302,025 | Gould | Nov. 17, 1942 |
| 2,346,616 | Saxby | Apr. 11, 1944 |
| 2,346,869 | Poole | Apr. 18, 1944 |